(12) United States Patent
Seol et al.

(10) Patent No.: US 10,713,640 B2
(45) Date of Patent: Jul. 14, 2020

(54) MOBILE TERMINAL AND CONTROL METHOD THEREFOR

(71) Applicant: LG ELECTRONICS INC., Seoul (KR)

(72) Inventors: Jie Seol, Seoul (KR); Soyeon Yim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 15/759,820

(22) PCT Filed: Sep. 25, 2015

(86) PCT No.: PCT/KR2015/010231
§ 371 (c)(1),
(2) Date: Mar. 13, 2018

(87) PCT Pub. No.: WO2017/047854
PCT Pub. Date: Mar. 23, 2017

(65) Prior Publication Data
US 2018/0260803 A1    Sep. 13, 2018

(30) Foreign Application Priority Data

Sep. 15, 2015  (KR) ........................ 10-2015-0130511

(51) Int. Cl.
*G06Q 20/32*     (2012.01)
*G06Q 20/40*     (2012.01)
(Continued)

(52) U.S. Cl.
CPC ............. *G06Q 20/32* (2013.01); *G06F 21/32* (2013.01); *G06Q 20/102* (2013.01); *G06Q 20/40* (2013.01);
(Continued)

(58) Field of Classification Search
CPC .................................................. G06Q 20/32
See application file for complete search history.

(56) References Cited

U.S. PATENT DOCUMENTS 9,116,611 B2 *   8/2015 Seymour ............... G06F 3/0488
2013/0332826 A1* 12/2013 Karunamuni .......... G06Q 10/10
                                                               715/273
(Continued)

FOREIGN PATENT DOCUMENTS

JP         2011210221        10/2011
KR        1020140063816       5/2014
(Continued)

OTHER PUBLICATIONS

Apple, Apple-Pay, Jan. 10, 2015, all pages (Year: 2015).*
(Continued)

*Primary Examiner* — Hani M Kazimi
*Assistant Examiner* — Adam Hilmantel
(74) *Attorney, Agent, or Firm* — Lee, Hong, Degerman, Kang & Waimey

(57) ABSTRACT

The present invention relates to a mobile terminal having a touch screen configured to perform fingerprint recognition and a control method therefor. A mobile terminal according to an embodiment of the present invention comprises: a wireless communication unit; a touch screen including a fingerprint recognition sensor; and a controller configured to cause the touch screen to display a virtual home button at one area of the touch screen based on a touch received at the one area; perform fingerprint authentication on a fingerprint of a finger used to apply the touch to the virtual home button via the fingerprint recognition sensor when the touch is maintained at the one area after the virtual home button is displayed.

20 Claims, 23 Drawing Sheets

(51) Int. Cl.
  *H04M 1/67* (2006.01)
  *H04M 1/725* (2006.01)
  *G06F 21/32* (2013.01)
  *G06Q 20/10* (2012.01)
  *G06F 3/0488* (2013.01)
  *G06K 9/00* (2006.01)

(52) U.S. Cl.
  CPC ........ *G06Q 20/40145* (2013.01); *H04M 1/67* (2013.01); *H04M 1/7253* (2013.01); *H04M 1/72522* (2013.01); *G06F 3/0488* (2013.01); *G06K 9/00087* (2013.01); *H04M 2250/22* (2013.01)

(56) References Cited

U.S. PATENT DOCUMENTS

2015/0127550 A1* 5/2015 Khan .............. G06Q 20/40145 705/71
2015/0135108 A1* 5/2015 Pope ................. G06K 9/00006 715/767
2015/0348009 A1* 12/2015 Brown .............. G06Q 20/3227 705/16
2016/0371691 A1* 12/2016 Kang .................... G06F 21/32

FOREIGN PATENT DOCUMENTS

| | | |
|---|---|---|
| KR | 1020150021943 | 3/2015 |
| KR | 1020150044669 | 4/2015 |
| KR | 1020150045271 | 4/2015 |
| KR | 1020150087667 | 7/2015 |
| KR | 1020150092479 | 8/2015 |

OTHER PUBLICATIONS

Korean Intellectual Property Office Application Serial No. 10-2015-0130511, Notice of Allowance dated Jun. 30, 2017, 2 pages.
Korean Intellectual Property Office Application Serial No. 10-2015-0130511, Office Action dated Dec. 19, 2016, 7 pages.
PCT International Application No. PCT/KR2015/010231, Written Opinion of the International Searching Authority dated Jun. 15, 2016, 4 pages.

* cited by examiner

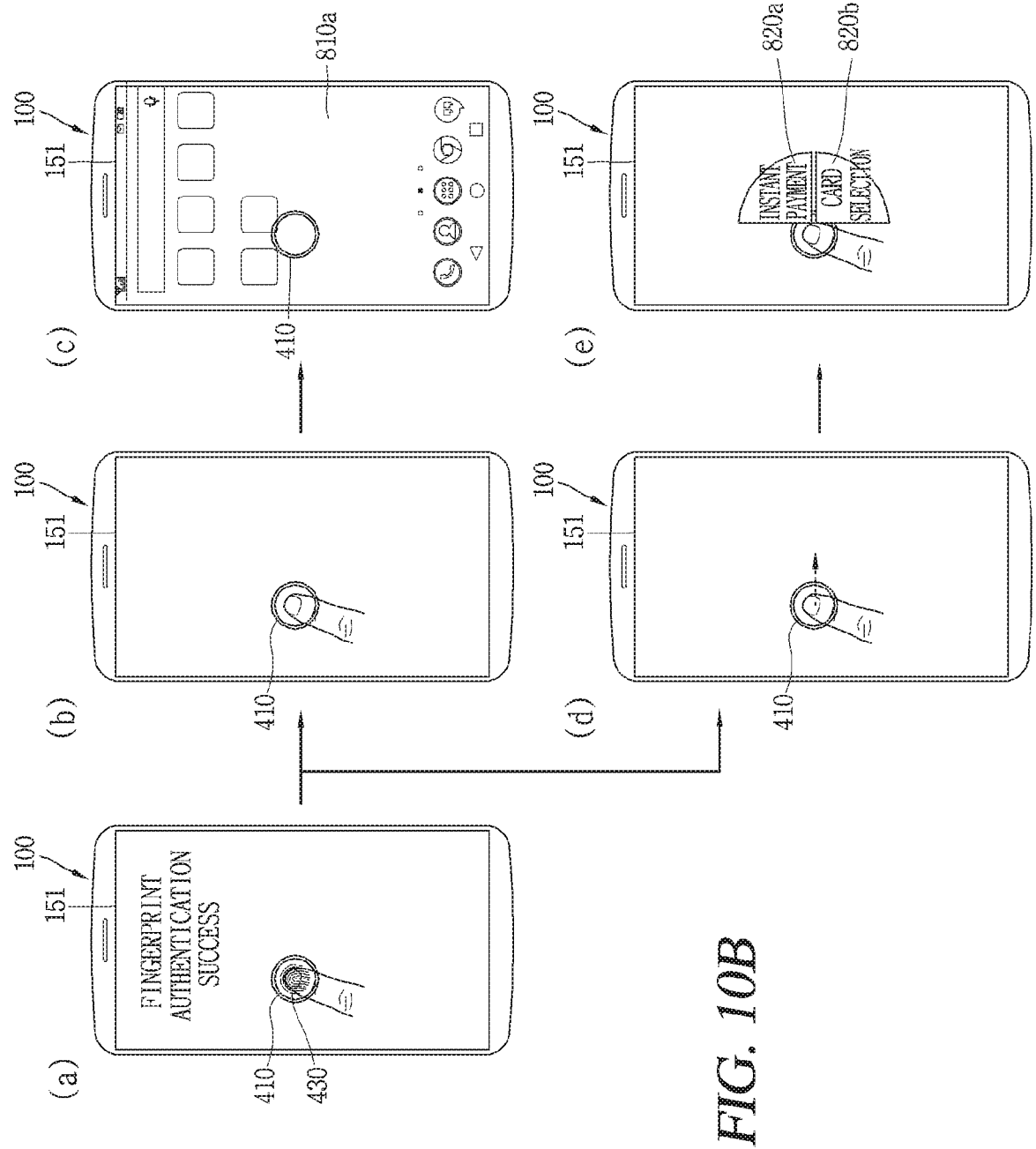

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/010231, filed on Sep. 25, 2015, which claims the benefit of earlier filing date and right of priority to Korean Application No. 10-2015-0130511, filed on Sep. 15, 2015, the contents of which are all hereby incorporated by reference herein in their entirety.

TECHNICAL FIELD

The present invention relates to a mobile terminal having a touch screen configured to perform fingerprint recognition and a control method thereof.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Recently, as a fingerprint recognition function is built in a terminal, and security is enhanced by using a fingerprint recognized through a fingerprint recognition function, various User Interfaces (UIs) and User Experiences (UXs) using fingerprints are being developed.

Also, in recent years, in order to secure a larger size of a display unit provided in a mobile terminal, there is a need to implement a hardware home button as a software virtual home button.

DISCLOSURE OF THE INVENTION

It is an object of the present invention to provide a mobile terminal capable of performing fingerprint recognition through a virtual home button and a control method thereof.

Another object of the present invention is to provide an optimized User Interface/User Experience (UI/UX) using a virtual home button.

Another object of the present invention is to provide a mobile terminal capable of performing payment or enhancing security through a method optimized using a virtual home button and fingerprint recognition and a control method thereof.

Embodiments of the present invention provide a mobile terminal including: a wireless communication unit; a touch screen including a fingerprint recognition sensor; and a control unit configured to output a virtual home button to one area on the basis of a touch applied to the one area on the touch screen, and perform fingerprint authentication on a fingerprint formed on a finger applying a touch to the virtual home button using the fingerprint recognition sensor, wherein when a touch continuous to the touch applied to the one area is maintained on the virtual home button, the control unit performs fingerprint authentication on a fingerprint formed on a finger applying the continuous touch, and performs a different operation during the fingerprint authentication according to whether a signal related to payment is received through the wireless communication unit.

In an embodiment, when the signal is received through the wireless communication unit during the fingerprint authentication, the control unit may control the wireless communication unit to transmit predetermined payment means information to a Point of Sale (POS) terminal that transmits the signal, and when the signal is not received through the wireless communication unit during the fingerprint authentication, control the touch screen to output a home screen page.

In an embodiment, the virtual home button may be associated with at least one of a home screen page output function, a fingerprint recognition function, and a payment related function, and the signal related to the payment may include a signal received from a POS terminal capable of performing wireless communication through the wireless communication unit.

In an embodiment, when a new touch different from the touch applied to the one area is applied to the virtual home button after the virtual home button is outputted, the control unit may perform a different function according to a touch type of the new touch.

In an embodiment, when the new touch is a first type touch, a home screen page may be outputted to the touch screen, and when the new touch is a second type touch different from the first type touch, the fingerprint authentication may be performed, and a payment related function may be performed on the basis of success of the fingerprint authentication.

In an embodiment, the first type touch may be a short touch in which a touch is applied within a reference time and the second type touch may be a long touch in which a touch is maintained for a reference time or longer to perform the fingerprint authentication.

In an embodiment, the control unit may perform a different operation according to whether a signal related to payment is received through the wireless communication unit during the fingerprint authentication.

In an embodiment, when the signal is received through the wireless communication unit during the fingerprint authentication, the control unit may transmit predetermined payment means information to a POS terminal that transmits the signal through the wireless communication unit, and when the signal is not received through the wireless communication unit during the fingerprint authentication, output an image related to payment means information to the touch screen.

In an embodiment, in a state where an image related to payment means information is outputted to the touch screen, when the mobile terminal enters within a space where wireless communication is possible with a POS terminal, the control unit may transmit the payment means information associated with the image to the POS terminal through the wireless communication unit.

In an embodiment, when a pressure of a touch applied to one area on the touch screen is equal to or greater than a reference pressure, the control unit may output the virtual home button.

In an embodiment, when the virtual home button is outputted, the control unit may generate a vibration indicating that the virtual home button is outputted. In an embodiment, on the basis of receipt of a signal related to payment through the wireless communication unit, the control unit may output the virtual home button to the touch screen.

In an embodiment, when the signal is received in a state where a touch is maintained in one area on the touch screen, the control unit may output the virtual home button to the one area, and when the signal is received in a state where no touch is applied to the touch screen, output the virtual home button at a predetermined position.

In an embodiment, the predetermined position may be determined by user setting or on the basis of areas where the virtual home button is previously outputted.

In an embodiment, when the signal is received, the control unit may output the virtual home button and an image related to payment means information together to the touch screen, and when fingerprint authentication is performed on a fingerprint formed on a finger applying a touch to the virtual home button, transmit the payment means information associated with the image to a POS terminal that transmits the signal through the wireless communication unit.

In an embodiment, on the basis of whether or not fingerprint authentication for a fingerprint formed on a finger applying a touch to the virtual home button is successful, the control unit may output different screen information to the touch screen In an embodiment, after fingerprint authentication for a fingerprint formed on a finger applying a first touch to the virtual home button is successful, according to a type of a second touch continuously applied to the first touch, the control unit may output different screen information to the touch screen.

In an embodiment, when the second touch continuously applied to the first touch is a long touch that is maintained for a reference time or longer on the virtual home button, a home screen page may be outputted to the touch screen, and when the second touch continuously applied to the first touch is a drag touch starting from the virtual home button, at least one graphic object associated with a payment related function around the virtual home button may be outputted.

EFFECT OF THE INVENTION

According to the present invention, there are provided a mobile terminal capable of performing fingerprint recognition through a touch screen and providing various functions through this and a control method thereof.

Also, since it is not necessary to provide a separate home button by outputting a virtual home button to an area of a touch screen where a touch is applied, the present invention may enlarge the size of the touch screen and output the virtual home button in the touched area, thereby significantly improving convenience for the user.

In addition, the present invention may provide a user interface capable of performing fingerprint recognition through a virtual home button and performing payment when fingerprint recognition is successful.

The additional scope of applicability of the present invention will become apparent from the following detailed description. However, since various changes and modifications within the spirit and scope of the present invention are be understood by those skilled in the art, it should be understood that the specific embodiments, such as the detailed description and the preferred embodiments of the present invention, are given as examples only.

BRIEF DESCRIPTION OF THE DRAWINGS

FIGS. 10A, 10B, 11A, 11B, 11C, 12A, and 12B are conceptual diagrams illustrating various user interfaces using a virtual home button according to an embodiment of the present invention.

BEST MODE OF THE INVENTION

Figure 1A:
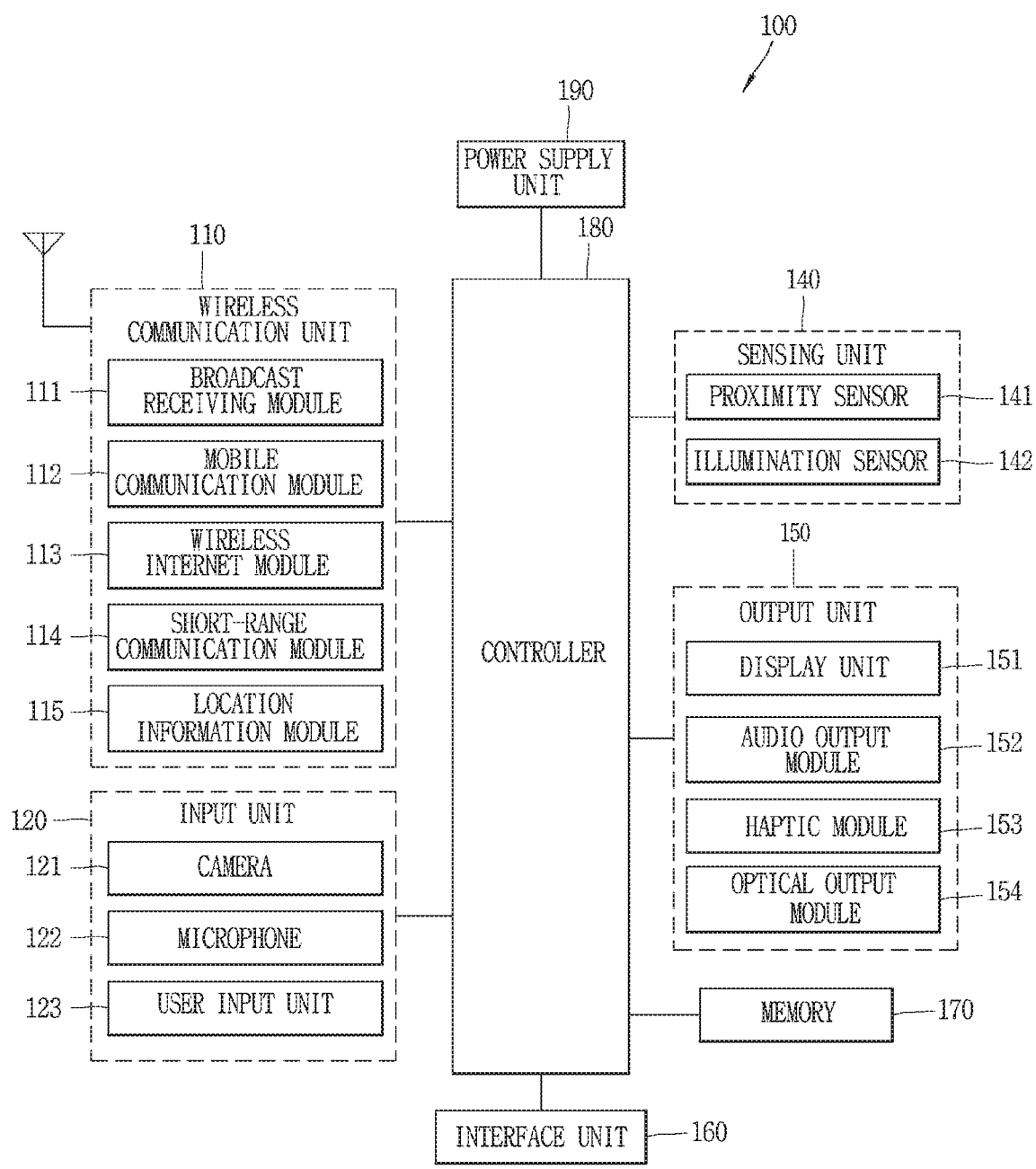
FIG. 1A is a block diagram illustrating a mobile terminal according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
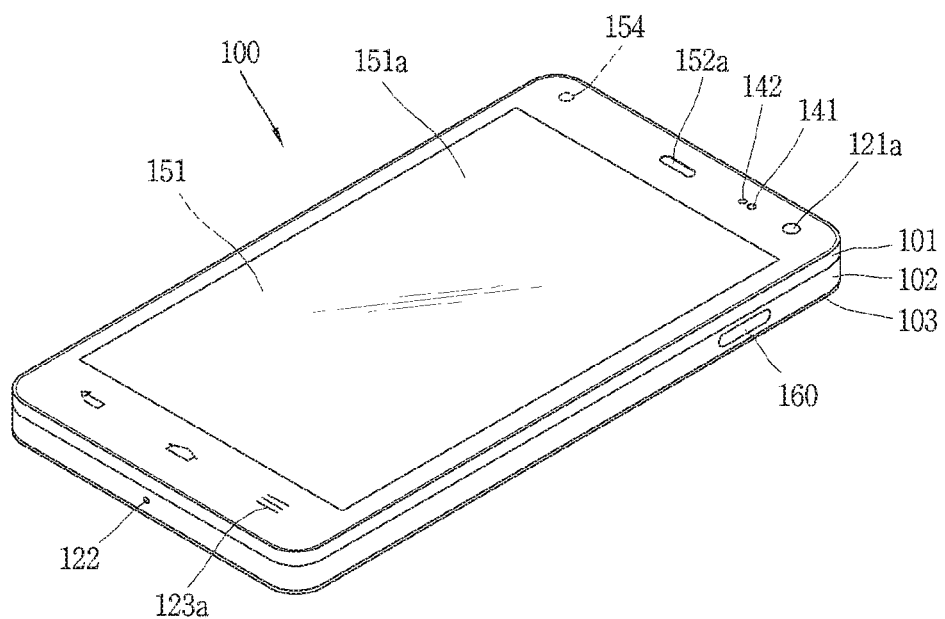
FIGS. 1B and 1C are conceptual diagrams when an example of a mobile terminal related to the present invention is seen in different directions.
Figure 1C:
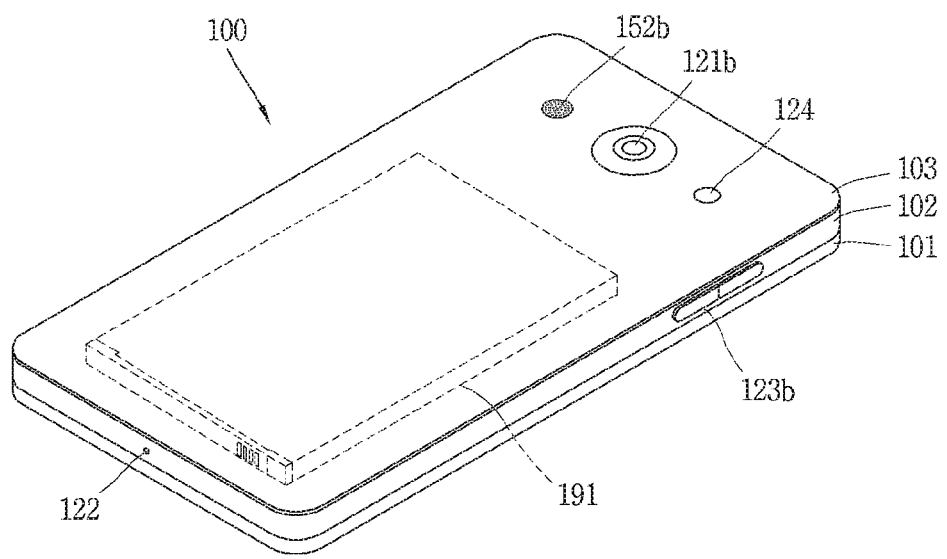

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sensing unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152*a*, the proximity sensor 141, the illumination sensor 142, the optical output module 154, the first camera 121*a*, and the first manipulation unit 123*a*, the side surface of the terminal body is shown having the second manipulation unit 123*b*, the microphone 122, and the interface unit 160, and the rear surface of the terminal body is shown having the second audio output module 152*b* and the second camera 121*b*.

However, those components may not be limited to the arrangement. Some components may be omitted or rearranged or located on different surfaces. For example, the first manipulation unit 123*a* may be located on another surface of the terminal body, and the second audio output module 152*b* may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof.

For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

A mobile terminal according to an embodiment of the present invention, which includes at least one of the above-described components, may detect a touch input (or touch) on the touch screen 151, and perform fingerprint recognition on the fingerprint formed on the finger with which the touch screen 151 is touched.

Hereinafter, a mobile terminal capable of detecting a touch input through the touch screen 151 and performing fingerprint recognition on a fingerprint formed on a finger applying a touch input will be described with reference to the accompanying drawings.

Figure 2:
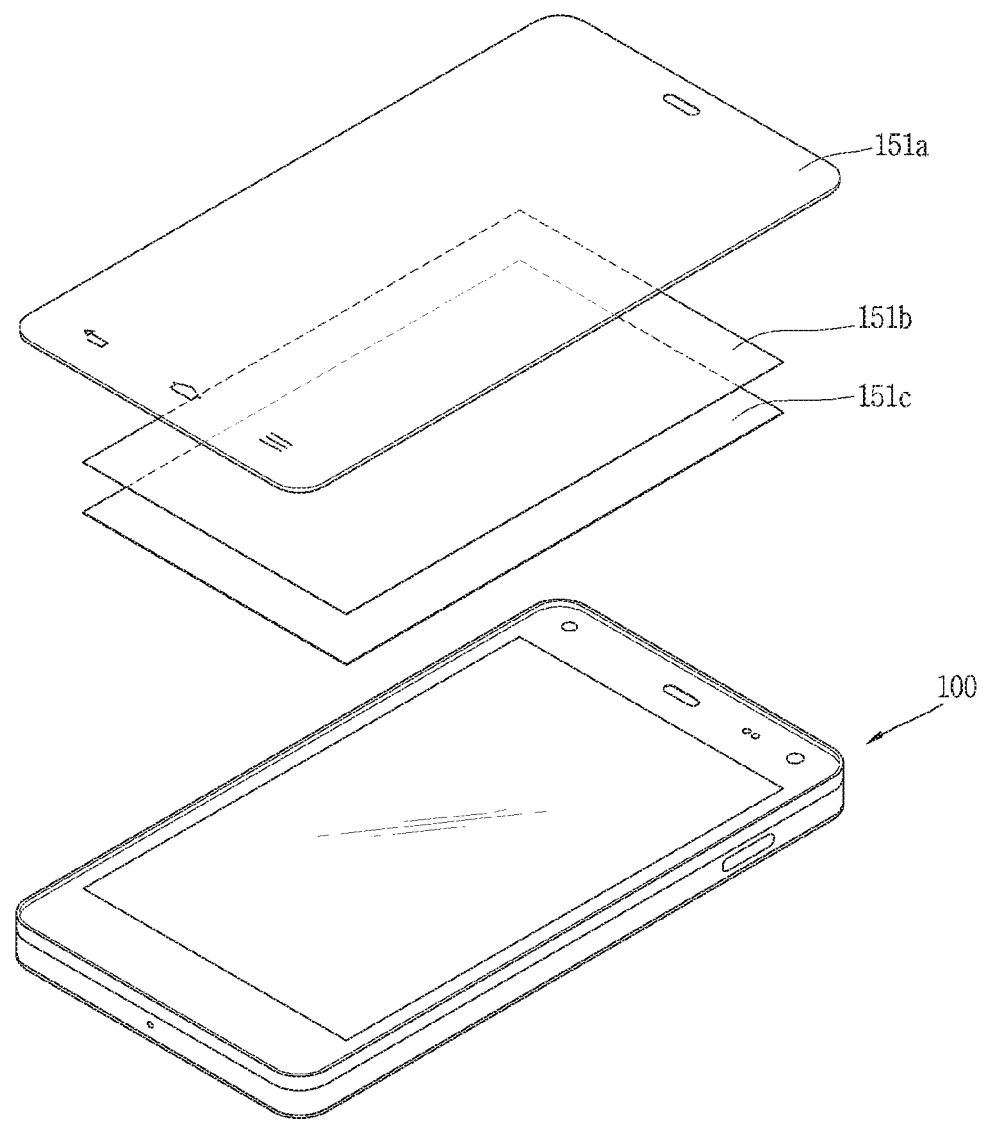
FIG. 2 is a conceptual diagram for illustrating a fingerprint recognition sensor according to an embodiment of the present invention.

FIG. 2 is a conceptual diagram for illustrating a fingerprint recognition sensor according to an embodiment of the present invention.

A mobile terminal 100 according to the present invention may include a touch screen 151 (or a display unit) having a touch sensor 151b as shown in FIG. 2. When a touch input is applied to the touch screen 151, the mobile terminal 100 may sense the touch input using the touch sensor 151b. For example, the touch sensor 151b may determine whether or not a touch input is applied on the basis of a change in capacitance of a capacitor included in the touch sensor according to a touch input.

Specifically, the touch sensor 151b may be configured to convert a pressure applied to a specific portion of the touch screen 151 or changes in capacitance occurring at a specific portion into electrical input signals. The touch sensor 151b may be configured to detect a position and area that a touch target applying a touch on the touch screen 151 touches the touch sensor, a pressured when touched, and a capacitance when touched.

For example, the control unit 180 may determine an area (or a point) to which a touch input is applied to the touch screen 151 on the basis of a point at which the capacitance of the touch sensor 151b is changed. In addition, the control unit 180 may extract the pressure applied to the touch input on the basis of at least one of the degree of change of the capacitance of the touch sensor 151b and the area to which the touch input is applied.

Here, the touch target, as an object applying a touch on the touch sensor 151b, may be a finger, a touch pen, a stylus pen, or a pointer, for example. Hereinafter, it is described that a touch target to which a touch input is applied is a finger.

Even when the touch screen 151 is inactivated, the touch sensor 151b may sense a touch input from the touch target. The disabled state of the touch screen 151 may mean that screen information (or a backlight for outputting the screen information) is not outputted to the touch screen 151.

For this, the touch sensor 151b may be supplied with minimum power for sensing the touch input while the touch screen 151 is inactive. Specifically, when the touch input is applied while the touch screen 151 is in the inactive state, the control unit 180 may sense the touch input and perform a specific function on the basis of the sensed touch input. For example, the specific function may be a function of switching the touch screen 151 from the inactive state to the active state. Here, activating the touch screen 151 may refer to a state where screen information (or a backlight for outputting the screen information) is outputted to the touch screen 151. The type of the screen information may include all kinds of screen information outputted from the mobile terminal 100.

In such a manner, when there is a touch input on the touch sensor, signal(s) corresponding thereto are sent to a touch controller. The touch controller processes the signal(s) and then transmits corresponding data to the control unit 180. Thus, the control unit 180 may know which area of the touch screen 151 is touched or the like. Herein, the touch controller may be an additional component separated from the control unit 180 or may be the control unit 180 itself.

Meanwhile, the mobile terminal 100 may be provided with a fingerprint recognition sensor 151c for recognizing the fingerprint of the user, and the control unit 180 may use the fingerprint information sensed through the fingerprint recognition sensor 151c as authentication means.

The fingerprint recognition sensor may be built in the touch screen 151 or the user input unit 123. Specifically, the fingerprint recognition sensor may be formed so as to overlap with the touch sensor 151b provided on the touch screen 151.

When a touch input is applied to the touch screen 151, the control unit 180 may sense (recognize) the fingerprint information of the finger applied with the touch input using the fingerprint recognition sensor 151c. Also, when a touch input is applied to the touch screen 151, the control unit 180 extracts touch information related to the touch input by using the touch sensor 151b and senses the fingerprint information of the finger applied with the touch input using the fingerprint recognition sensor formed to overlap with the touch sensor. Here, the touch information related to the touch input and the fingerprint information may be generated on the basis of at least one touch input applied to the touch screen 151.

The fingerprint information may mean a fingerprint formed on a touch target to which a touch input is applied, for example, a user's finger. Here, the fingerprint information may be named fingerprint data, fingerprint image, fingerprint image, or the like. The fingerprint information may be information (data, image, and image) obtained by sensing (recognizing or extracting) a fingerprint formed on a finger applied with a touch input using the fingerprint recognition sensor.

The control unit 180 may perform fingerprint authentication (or fingerprint recognition) using the sensed fingerprint information. Specifically, the fingerprint refers to a pattern formed by a curved line at the end of a finger. These fingerprints do not change forever, and everyone has different shapes. Further, the fingerprints are formed in different shapes on each finger of a person.

Specifically, the fingerprint includes a ridge of the fingerprint and a valley engraved between the ridge and the ridge, and the fingerprint may include a pattern formed by the ridges and valleys.

The fingerprint information may include a pattern formed on the fingerprint. Further, the fingerprint information may include feature points (minutiae) such as a ridge end or a bifurcation.

The control unit 180 may perform fingerprint authentication on the basis of the minutiae. Specifically, the control unit 180 may perform fingerprint authentication on the basis of whether the fingerprint information sensed by the fingerprint recognition sensor corresponds to previously stored fingerprint information. At this time, the control unit 180 may perform fingerprint authentication on the basis of whether the minutiae included in the sensed fingerprint information coincide with the minutiae included in the previously stored fingerprint information.

The previously stored fingerprint information may be stored in the memory 170 according to user settings. Specifically, the control unit 180 receives fingerprint information (previously stored fingerprint information) used for fingerprint authentication from the user and stores the fingerprint information in the memory.

A plurality of fingerprint information may be stored in the memory 170 in advance. The plurality of pieces of fingerprint information may be fingerprint information for each finger of a user and may be fingerprint information for different parts of the fingerprint included in one finger.

Meanwhile, the fingerprint authentication may be performed by a fingerprint controller. Specifically, when there is a touch input to the fingerprint recognition sensor (touch screen 151), the corresponding signal (s) is sent to the fingerprint controller. Herein, the signal(s) may be a signal generated by a touch input, or may be fingerprint information.

When the signal(s) is a signal generated by a touch input, the fingerprint controller may generate the fingerprint information using the signal(s). Then, the fingerprint controller may perform fingerprint authentication by determining whether the generated fingerprint information corresponds to previously stored fingerprint information.

When the signal(s) is fingerprint information, the fingerprint controller may perform fingerprint authentication using the fingerprint information.

When the fingerprint authentication is performed in the fingerprint controller, the previously stored fingerprint information may be stored in the fingerprint controller.

Then, the fingerprint controller transmits the fingerprint authentication result to the control unit 180. Accordingly, the control unit 180 may authenticate (identify) the user who applied the touch input using the fingerprint information of the finger applied the touch input to the touch screen 151. In addition, the control unit 180 may perform different functions according to the result of the fingerprint authentication. Herein, the fingerprint controller may be an additional component separated from the control unit 180 or may be the control unit 180 itself.

The touch screen 151 may include a touch sensor 151b and a fingerprint recognition sensor 151c formed to overlap at least a part of the touch sensor 151b.

The fingerprint recognition sensor 151c may have the same size as that of the touch sensor 151b and may be overlapped with the touch sensor 151b. In addition, the fingerprint recognition sensor 151c may be formed so as to overlap only at least a part (or a part) of the touch sensor 151b. The touch sensor 151b and the fingerprint recognition sensor 151c may be provided under the window 151a provided in the touch screen 151 or may be included in the window 151a.

Also, the order in which the touch sensor 151b and the fingerprint recognition sensor 151c are overlapped is not limited to the overlapping order shown in FIG. 2.

Meanwhile, the configuration for sensing (receiving) touch input on the touch screen 151 and performing fingerprint recognition is not limited to the hardware configuration described above, and may be implemented using at least one of System in Package (SiP) technology and Touch and Display Driver Integration (TDDI) single chip technology.

Moreover, the mobile terminal according to the present invention, which includes at least one of the above-described components, may perform various functions using touch input and fingerprint recognition functions performable on the touch screen 151.

Figure 3:
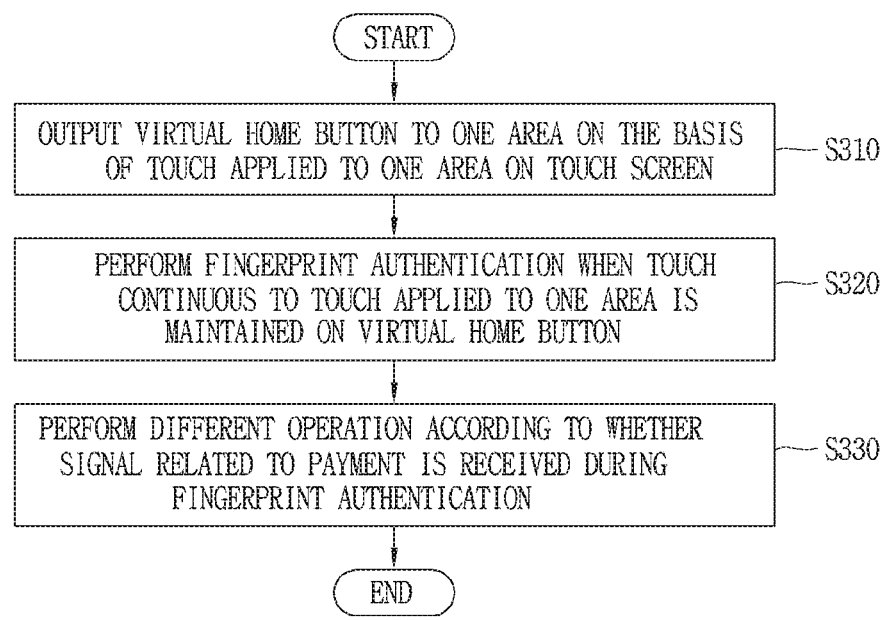
FIG. 3 is a flowchart illustrating a control method according to the present invention.

FIG. 3 is a flowchart illustrating an exemplary control method of the present invention, and FIGS. 4A and 4B are conceptual diagrams for illustrating the control method illustrated in FIG. 3.

First, in the present invention, on the basis of a touch applied to one area on the touch screen, outputting a virtual home button to the one area is performed (S310).

Specifically, when a touch is applied to the touch screen 151, the control unit 180 may determine an area to which the touch is applied using the touch sensor 151b (see FIG. 2)

provided on the touch screen 151. Then, the control unit 180 may output the virtual home button to one area to which the touch is applied.

The virtual home button may be understood as a graphic object, an image, a button, or the like, which implements a conventional hardware home button (or home key) by software. The virtual home button may be called a virtual home button, a virtual home key, or the like.

The virtual home button may be related to at least one of a home screen page output function, a fingerprint recognition function, and a payment related function. Specifically, the control unit 180 may output a home screen page or perform fingerprint authentication (or fingerprint recognition) on the basis of a method of touching the virtual home button.

In addition, the control unit 180 may perform fingerprint authentication for the fingerprint formed on the finger to which the touch is applied while the touch is maintained on the virtual home button. At this time, depending on whether or not a signal related to settlement is received from an external terminal (e.g., the POS terminal 200) during the fingerprint authentication, the control unit 180 may perform a function related to payment or may output a home screen page (the details of which will be described in more detail later in operations S320 and S330). Here, the signal related to payment is a signal received from the POS terminal 200 capable of performing wireless communication through the wireless communication unit 110, and may be a signal transmitted from the POS terminal 200 to the mobile terminal 100 to perform payment.

The control unit 180 may detect (sense) the touch event when the touch screen 151 is in the active state as well as in the inactive state. Here, the active state may be an on state in which certain screen information is outputted. In addition, the inactive state may be an off state in which no screen information is outputted.

When a touch is applied while the touch screen 151 is inactive, the control unit 180 may activate one of the touch areas of the touch screen 151 and output a virtual home button to the one area.

However, the present invention is not limited thereto, and when a touch is applied in the deactivated state, the control unit 180 changes the entire touch screen 151 from the inactive state to the active state and outputs the virtual home button to one area to which the touch is applied. In this case, for example, the control unit 180 may output an area other than the one area in a color (e.g., black) requiring minimum power.

When a touch is applied while the touch screen 151 is active, the control unit 180 may output the virtual home button by overlapping the screen information being outputted to the touch screen 151 in one area to which the touch is applied.

Meanwhile, the virtual home button may be displayed so as to correspond to one area to which the touch is applied. In addition, the virtual home button may be displayed on the touch screen so as to have a predetermined size (or a preset shape) on the basis of one area to which the touch is applied.

The above described contents, that is, the fact that the control unit 180 outputs the virtual home button to one area on the basis of the touch applied to one area on the touch screen, may include meaning that the control unit 180 outputs a virtual home button so as to correspond to the one area, and outputs a virtual home button having a predetermined size (or a predetermined shape) on the basis of the one area, outputs a virtual home button to a part of the one area, or outputs a virtual home button having a size exceeding the size of the one area on the basis of the one area.

Figure 4:
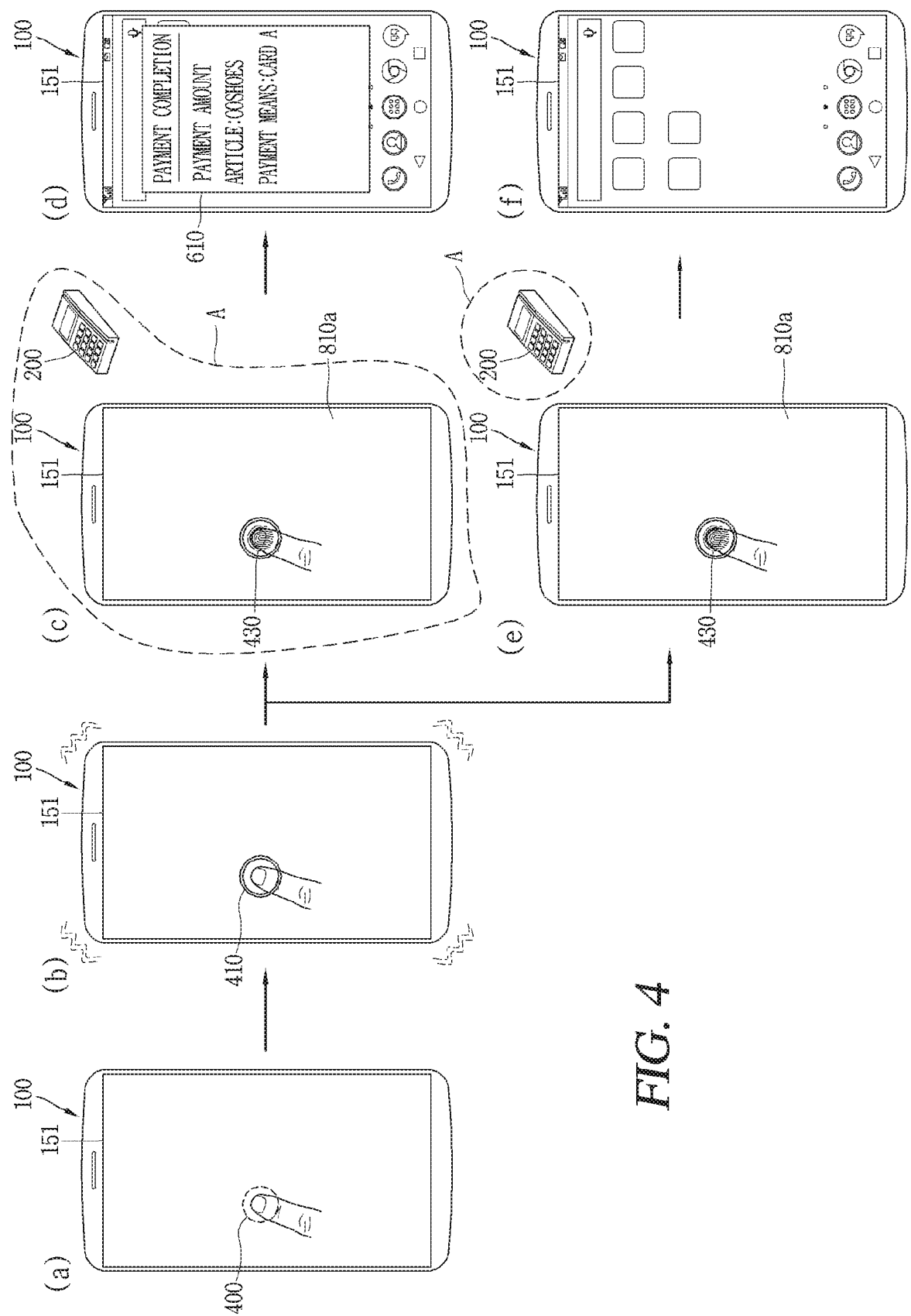
FIG. 4 is a conceptual diagram for describing the control method of FIG. 3.

Referring to FIG. 4, as shown in (a) of FIG. 4, when a touch (or a predetermined type of touch) is applied to one area 400 of the touch screen 151, the control unit 180 may output the virtual home button 410 to the one area 400 as shown in (b) of FIG. 4.

When the touch (or a predetermined type of touch) is applied in the inactive state of the touch screen 151, the control unit 180 detects (recognizes) the touch and determines the detected area. Thereafter, the control unit 180 switches the touch screen 151 from the inactive state to the active state, and outputs the virtual home button 410 on the basis of the detected area.

When the touch (or a predetermined type of touch) is applied in the active state of the touch screen 151, the control unit 180 may sense (recognize) the touch and output the virtual home button 410 so as to correspond to the detected area of the touch (or on the basis of the sensed area). At this time, when any screen information is being outputted to the touch screen 151, which is the active state, the virtual home button 410 may be overlapped on any screen information and outputted.

The predetermined type of touch is a touch related to a function of outputting a virtual home button, and may include various types of touches.

For example, the various types of touches include a short (or tap) touch, a long touch, a double touch, a multi touch, a drag touch, a flick touch, a pinch-in touch, a pinch-out touch, a swipe touch, a hovering touch, and a force touch.

Hereinafter, the various types of touches will be described in more detail.

The short (or tap) touch is a touch that is released within a predetermined time after a touch target (e.g., a finger or a stylus pen) is contacted to the touch screen 151 (after a touch is applied). For example, the short (or tap) touch may be a touch in which a touch target touches the touch screen for a short time, such as a single click of a mouse.

The long touch may be a touch that is maintained for a predetermined time or more after the touch target touches the touch screen 151. For example, the long touch may be a touch in which the touch is maintained for a predetermined time after a touch is applied to the touch screen 151 by a touch target. More specifically, the long touch may be a touch that is released after the touch is maintained for a predetermined time or longer at one point on the touch screen. Also, the long touch may be understood as a touch corresponding to a touch and hold operation for maintaining a contact state of the touch target on the touch screen 151 for a predetermined time or longer.

The double touch may be a touch in which the short touch is continuously applied at least twice within a predetermined time on the touch screen 151.

The predetermined time described in the short-touch, long-touch, and double-touch may be determined by user setting.

A multi touch may be a touch that is applied to at least two touch points at substantially the same time on the touch screen 151.

A drag touch is a touch in which a touch starting at a first point of the touch screen 151 is continuously applied along one direction on the touch screen and the touch is released at a second point different from the first point.

Specifically, the drag touch is a touch in which a touch applied to one point of the touch screen 151 by a touch target is continuously extended on the touch screen 151 and then is released from a point different from the one point.

In addition, the drag touch may mean a touch that is continuously extended from a touch after the touch is applied to one point of the touch screen 151.

A flick touch may be a touch to which the drag touch is applied within a predetermined time. Specifically, the flick touch may be a touch in which a touch target for applying the drag touch is released from the touch screen 151 within a predetermined time. In other words, the flick touch may be understood as a drag touch that is applied at a speed higher than a predetermined speed.

The swipe touch may be a drag touch that is applied in a straight line. A pinch-in touch is a touch in which at least one of first and second touches applied to two different points (spaced two points) on the touch screen 151 extends in a direction to be close to each other. For example, the pinch-in touch may be a touch implemented by an operation of narrowing the intervals of each of the fingers in a state where the fingers are in contact with the two spaced points on the touch screen 151.

A pinch-out touch is a touch in which at least one of first and second touches applied to two different points (spaced two points) on the touch screen 151 extends in a direction to be farther to each other. For example, the pinch-out touch may be a touch corresponding to an operation of widening (estranging) each of the fingers in a state where the fingers are in contact with the two spaced points on the touch screen 151.

The hovering touch is a touch corresponding to an operation of a touch target in the space away from the touch screen 151 while the touch target does not touch the touch screen 151, and for example, may be the proximity touch described with reference to FIG. 1. For example, the hovering touch may be a touch corresponding to an operation in which the touch target is maintained for a predetermined time or longer at a position spaced apart from the touch screen 151.

The force touch refers to a touch in which the touch target applies a pressure higher than a predetermined pressure to the touch screen 151. The predetermined pressure may be determined by a user, or may be determined by the characteristics of the touch screen 151 (or the touch sensor).

In this specification, an example in which a predetermined type of touch related to a function of outputting a virtual home button is a short touch, a long touch, or a force touch will be described. However, the predetermined type of touch may be applied to the various types of touches described above in the same or similar manner.

When the touch (or a predetermined type of touch) is applied in the active state of the touch screen 151, the control unit 180 may sense (recognize) the touch and output the virtual home button 410 so as to correspond to the detected area of the touch (or on the basis of the sensed area). At this time, when any screen information is being outputted to the touch screen 151, which is the active state, the virtual home button 410 may be overlapped on any screen information and outputted.

Referring back to FIG. 3, in the present invention, when a touch continuous to the touch applied to the one area is maintained on the virtual home button, an operation of performing fingerprint authentication for the fingerprint formed on the finger applying the continuous touch is performed (S320).

Specifically, the control unit 180 may be configured to perform fingerprint authentication (or fingerprint recognition) on a fingerprint formed on a finger applying a touch to the virtual home button by using the fingerprint recognition sensor 151c. As described with reference to FIG. 2, the touch sensor 151b and the fingerprint recognition sensor 151c may be overlapped and disposed on the touch screen 151.

The control unit 180 senses fingerprint information of a finger applying a touch to one area of the touch screen 151, and performs fingerprint recognition (fingerprint authentication) using the sensed fingerprint information.

Here, the fingerprint recognition (fingerprint authentication) may be performed on the basis of whether a touch applied to the one area is maintained for a predetermined time, or a new touch is applied after the touch is applied to the one area. In other words, the fact that the touch continuous to the touch applied to the one area is maintained on the virtual home button means that the touch applied to the one area is not released on the touch screen 151 but remains on the touch screen 151 for a predetermined time.

For example, the control unit 180 may output the virtual home button 410 to the one area 400 on the basis of a touch applied to one area 400 on the touch screen 151. Thereafter, when the touch is not released and a touch continuous to the touch is maintained on the virtual home button 410, the control unit 180 performs fingerprint authentication for the fingerprint formed on the finger applying the continuous touch. That is, while the touch applied in (a) of FIG. 4 is maintained until (b) and (c) (or (e)) of FIG. 4, the control unit 180 may output the virtual home button 410 to the area 400 to which the touch is applied, and perform the fingerprint authentication 430 on the fingerprint formed on the finger applying the touch maintained on the virtual home button 410 (or a touch continuous to the touch).

However, the present invention is not limited thereto. When the virtual home button 410 is outputted and then a new touch different from the applied touch for outputting the virtual home button 410 is applied to the virtual home button 410, the control unit 180 may perform fingerprint authentication for the fingerprint formed on the finger applying the new touch (the related contents will be described in detail later with reference to FIG. 5).

Hereinafter, according to the present invention, when the fingerprint authentication is successful, the predetermined function (operation) may be performed. At this time, the control unit 180 may perform different operations according to whether or not a signal related to payment is received through the wireless communication unit 110 during the fingerprint authentication (S330).

Here, the different operations assume that the fingerprint authentication is successful. In other words, when the fingerprint authentication is successful in a state where the signal related to payment is received during the fingerprint authentication, the control unit 180 performs a first operation. When the fingerprint authentication is successful in a state where the signal related to payment is not received during the fingerprint authentication, the control unit 180 may perform a second operation different from the first operation.

For example, as shown in (c) of FIG. 4, when a signal related to payment is received through the wireless communication unit during the fingerprint authentication, the control unit 180 may transmit a payment related function (operation). For example, when a signal related to payment is received through the wireless communication unit during the fingerprint authentication, the control unit 180 may control the wireless communication unit to transmit the predetermined payment means information to the POS terminal 200 that transmits the signal.

As another example, as shown in (e) of FIG. 4, when the signal is not received through the wireless communication unit during the fingerprint authentication, as shown in (f) of FIG. 4, the control unit 180 may control the touch screen 151 to output a home screen page.

Here, the reception of the signal related to payment may mean that a mobile terminal exists in the space A where wireless communication is possible with the POS terminal 200 transmitting the signal related to payment. In other words, as shown in (c) of FIG. 4, when the fingerprint authentication 430 is performed in the space A where the mobile terminal 100 is able to perform wireless communication with the POS terminal 200, the control unit 180 may transmit the predetermined payment means information to the POS terminal 200. In addition, as shown in (e) of FIG. 4, when the fingerprint authentication is performed in a place where the mobile terminal 100 is out of the space A where wireless communication with the POS terminal 200 is possible, the control unit 180 may output the home screen page to the touch screen 151.

The signal related to payment means a signal transmitted from the POS terminal 200 to perform a payment. For example, the signal related to payment may include article information (article name, article price, and the like) to be a payment target, POS terminal location information, total payment price information, and the like.

The payment means information means information related to the payment means previously stored in the mobile terminal 100 (specifically, the memory 170). For example, the payment means information may include card information (e.g., card type, card number, validity period, CVC number, and the like) and mobile terminal information (user information, telephone number, carrier information, and the like).

Hereinafter, for convenience of explanation, it is assumed that the payment means is a card. In this case, the payment means information may mean card information.

Thereafter, when payment related information (e.g., payment completion information, payment failure information, detailed payment information, and the like) is received from the POS terminal 200, as shown in (d) of FIG. 4, the control unit 180 may output the information related to the payment to the touch screen 151. When the information related to the payment is payment completion information, the control unit 180 may output the receipt information 610 (or payment completion information) to the touch screen 151 on the basis of the payment completion information.

However, the present invention is not limited thereto. When a signal related to payment is received through the wireless communication unit during the fingerprint authentication, the control unit 180 may output the image corresponding to the payment means information to the touch screen 151 instead of transmitting the predetermined payment means information to the POS terminal 200. On the basis of a predetermined type of touch (e.g., a drag touch, a swipe touch, a flick touch, and the like) applied to the image corresponding to the payment means information, the control unit 180 may change the image corresponding to the other payment means information. Thereafter, on the basis of a user request (e.g., a touch on the graphic object to which the payment means information transfer function is associated), the control unit 180 may transmit the payment means information related to the image outputted to the touch screen 151 to the POS terminal 200 through the wireless communication unit 110.

When a signal related to payment is received during the fingerprint authentication, whether to transmit the predetermined payment means information to the POS terminal 200 or output an image corresponding to the payment means information to the touch screen 151 may be determined on the basis of the user setting or determined on the basis of the touch method continuously applied after the fingerprint authentication is successful.

For example, when the continuously applied touch is a first type touch (e.g., a long touch), the control unit 180 may transmit the predetermined payment means information to the POS terminal 200. As another example, when the continuously applied touch is a second type touch (e.g., a short touch), the control unit 180 may output an image corresponding to the payment means information to the touch screen 151.

Also, when the fingerprint authentication is successful in a state where a signal related to payment is received during the fingerprint authentication, the control unit 180 outputs to the touch screen 151 a selection window for determining whether to transmit the predetermined payment means information to the POS terminal 200 or to output an image corresponding to the payment means information, and then perform an operation corresponding to the input on the basis of a user input through the selection window.

Through this configuration, the present invention may perform a virtual home button output and a fingerprint authentication by using only one touch applied to one area of the touch screen 151 and further perform a payment or provide a user interface for outputting a home screen page on the basis of whether a signal related to payment is received, Hereinafter, a method for performing various operations on the basis of a new touch after a virtual home button is outputted will be described with reference to the accompanying drawings.

Figure 5:
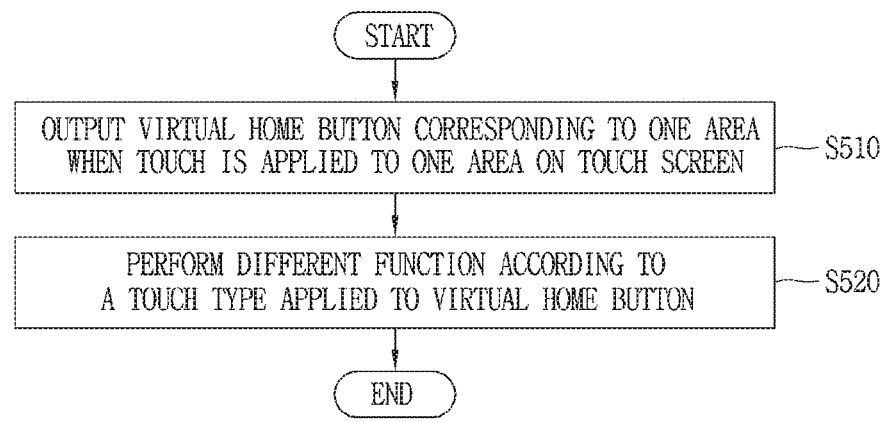
FIG. 5 is a flowchart illustrating a control method according to an embodiment of the present invention.
Figure 6A:
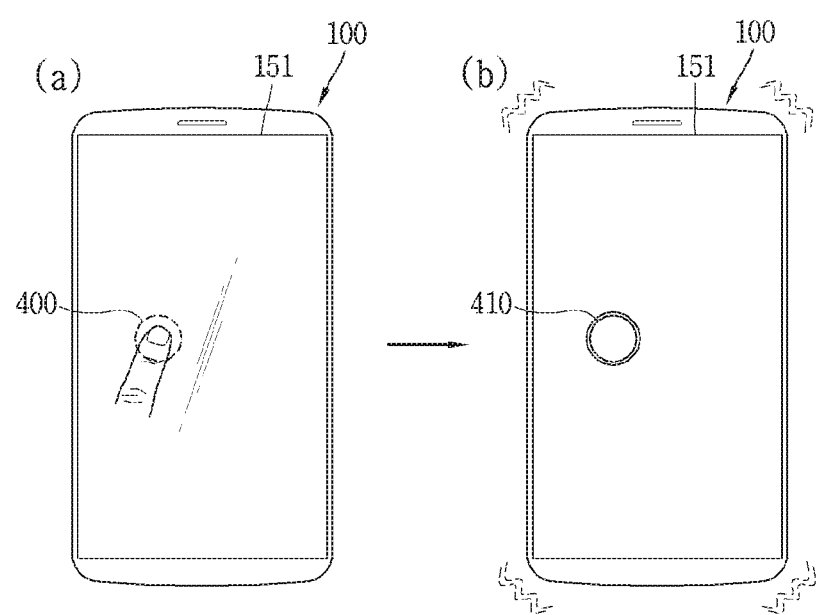
FIGS. 6A and 6B are conceptual diagrams for describing the control method of FIG. 5.
Figure 6B:
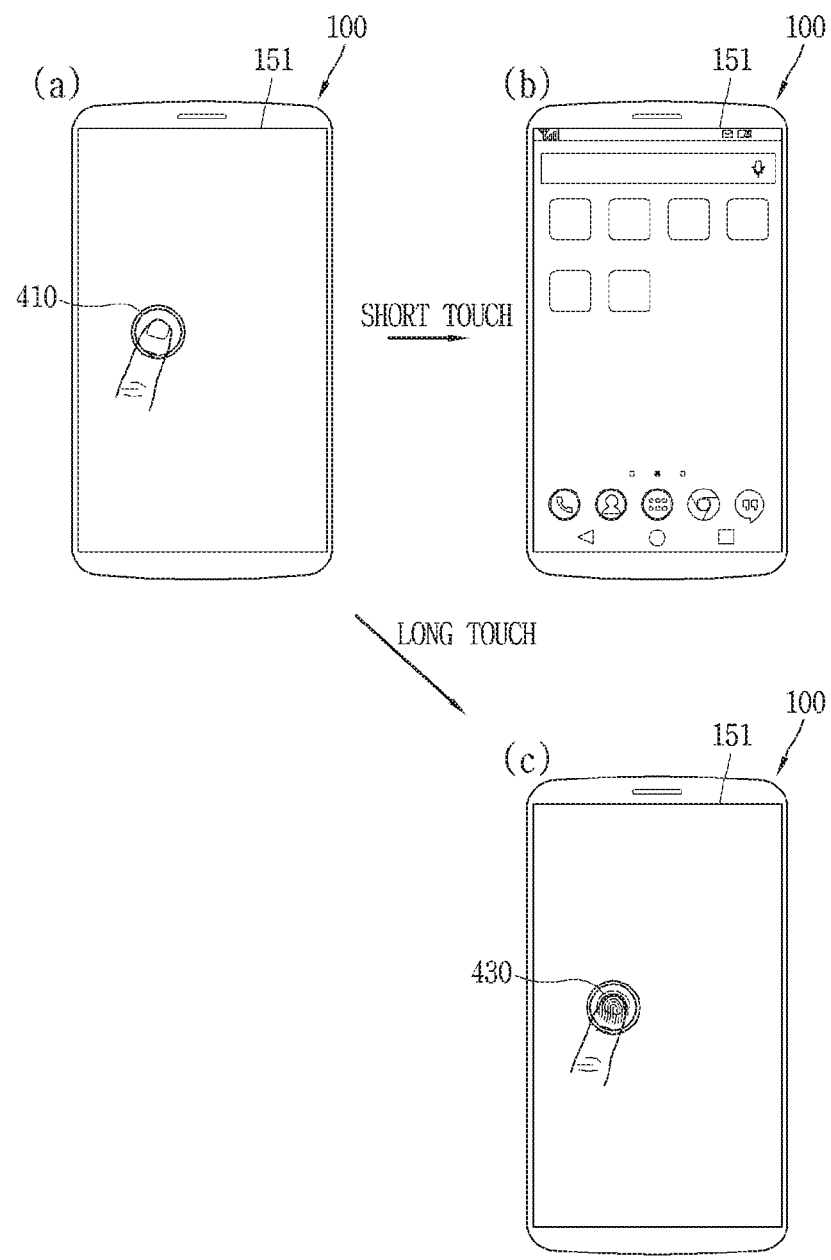

FIG. 5 is a flowchart illustrating a control method according to an embodiment of the present invention, and FIGS. 6A and 6B are conceptual diagrams illustrating the control method shown in FIG. 5.

Referring to FIG. 5, in the present invention, when a touch is applied to one area on the touch screen, an operation of outputting a virtual home button corresponding to the one area is performed (S510).

Referring to FIG. 6A, as shown in (a) FIG. 6A, when a touch (or a predetermined type of touch) is applied to one area 400 of the touch screen 151, the control unit 180 may output the virtual home button 410 to the one area 400 as shown in (b) FIG. 6A.

Also, as shown in (b) of FIG. 6A, when the virtual home button 410 is outputted, the control unit 180 may generate the vibration by controlling the haptic module 153 (see FIG. 1A) to notify that the virtual home button 410 is outputted.

Thereafter, in the present invention, after a touch is applied to the touch screen 151, an operation of performing different functions according to the touch method applied to the virtual home button outputted in one area to which the touch is applied is performed (S520).

Specifically, when a new touch different from the touch applied to the one area is applied to the virtual home button after the virtual home button is outputted, the control unit 180 may perform different functions according to the touch method of the new touch.

Specifically, on the basis of touching one area on the touch screen 151, when the virtual home button is outputted, the control unit 180 may perform different functions according to a new touch method applied to the virtual home button.

For example, when the new touch applied to the virtual home button 410 is the touch of the first mode, the control unit 180 may output the home screen page to the touch screen 151.

As another example, when a new touch applied to the virtual home button 410 is applied to a touch of a second method different from the first method, the control unit 180 may perform the fingerprint authentication. Thereafter, the control unit 180 may perform a function related to payment on the basis of the success of the fingerprint authentication.

The first and second type touches may be any one of various types of touches described above. For example, the first type touch may be a short touch, and the second type touch may be a long touch.

As shown in (a) of FIG. 6B, when the first type touch, for example, a short touch in which a touch is applied within a reference time, is applied to the virtual home button 410 outputted on the touch screen 151, the control unit 180 may output the home screen page, as shown in (b) of FIG. 6B.

Also, when a touch of a second type different from a first type, for example, a long touch maintained for a reference time or more to perform the fingerprint authentication, is applied to the virtual home button 410 outputted on the touch screen 151, the control unit 180 may perform the fingerprint authentication 430 as shown in (c) of FIG. 6B. As shown in (c) of FIG. 6B, when performing the fingerprint authentication, the control unit 180 may display the notification information (or a notification image) (e.g., a previously stored fingerprint image, or an image corresponding to fingerprint information recognized from the fingerprint recognition sensor) on the touch screen 151 (e.g., the virtual home button 410) to notify that the fingerprint authentication is being performed.

As described above, the present invention outputs a virtual home button on a touch screen. When a first type touch is applied to the virtual home button, the present invention outputs the home screen page to the touch screen. When the virtual home button is touched by a second type touch, the present invention performs fingerprint authentication. In addition, the present invention may perform a function related to payment on the basis of successful fingerprint authentication.

Hereinafter, a function related to payment performed when fingerprint authentication is successful through a virtual home button will be described in more detail with reference to the accompanying drawings.

Figure 7:
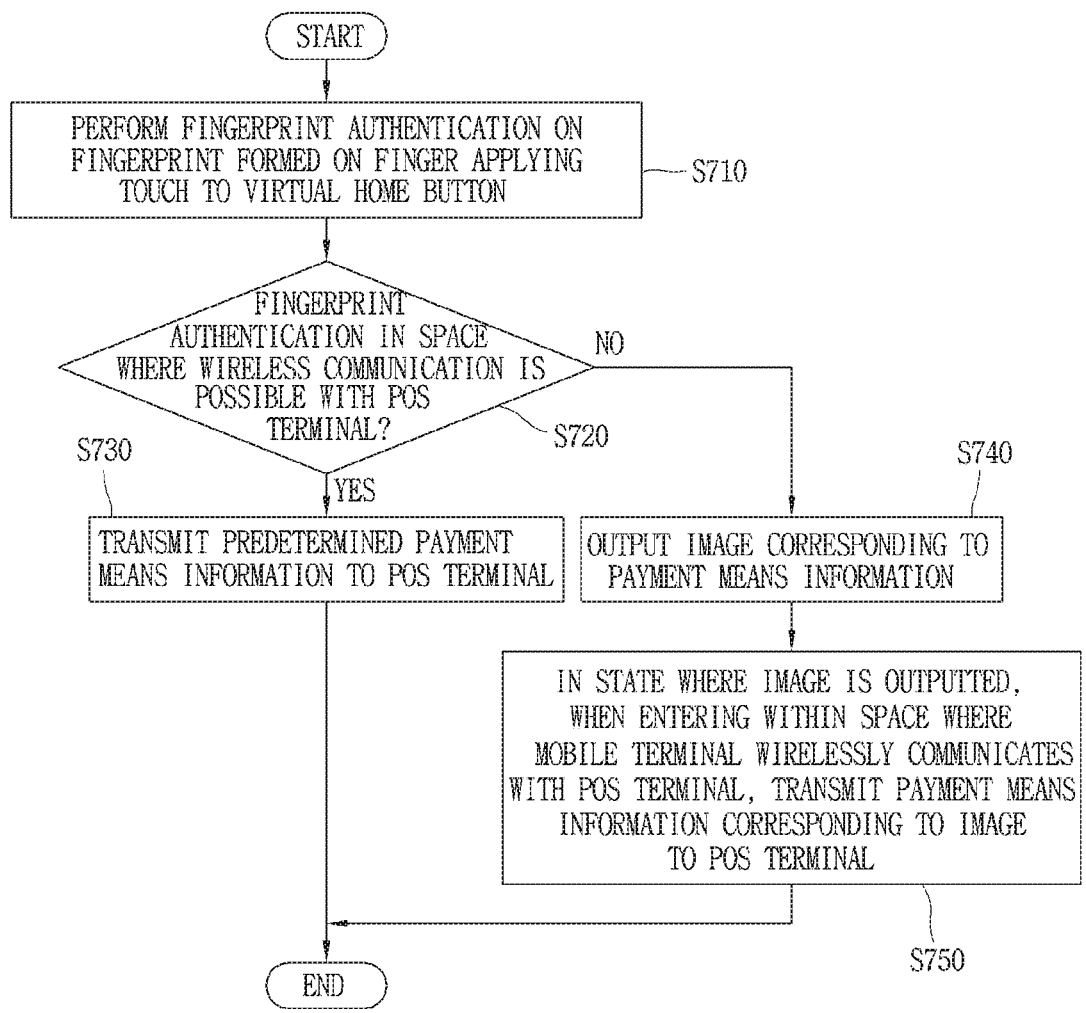
FIG. 7 is a flowchart illustrating a method of performing a payment using a virtual home button according to an embodiment of the present invention.
Figure 8A:
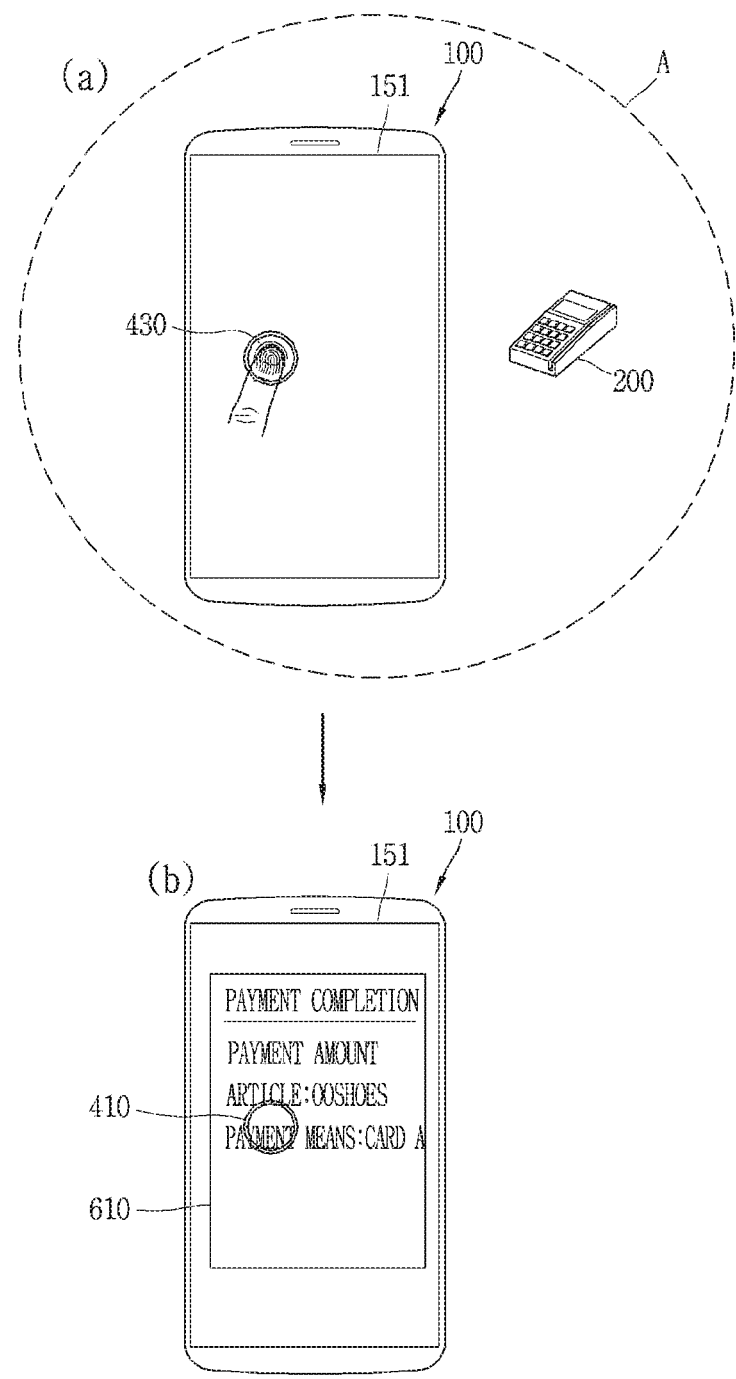
FIGS. 8A, 8B, and 8C are conceptual diagrams for illustrating the method shown in FIG. 7.
Figure 8B:
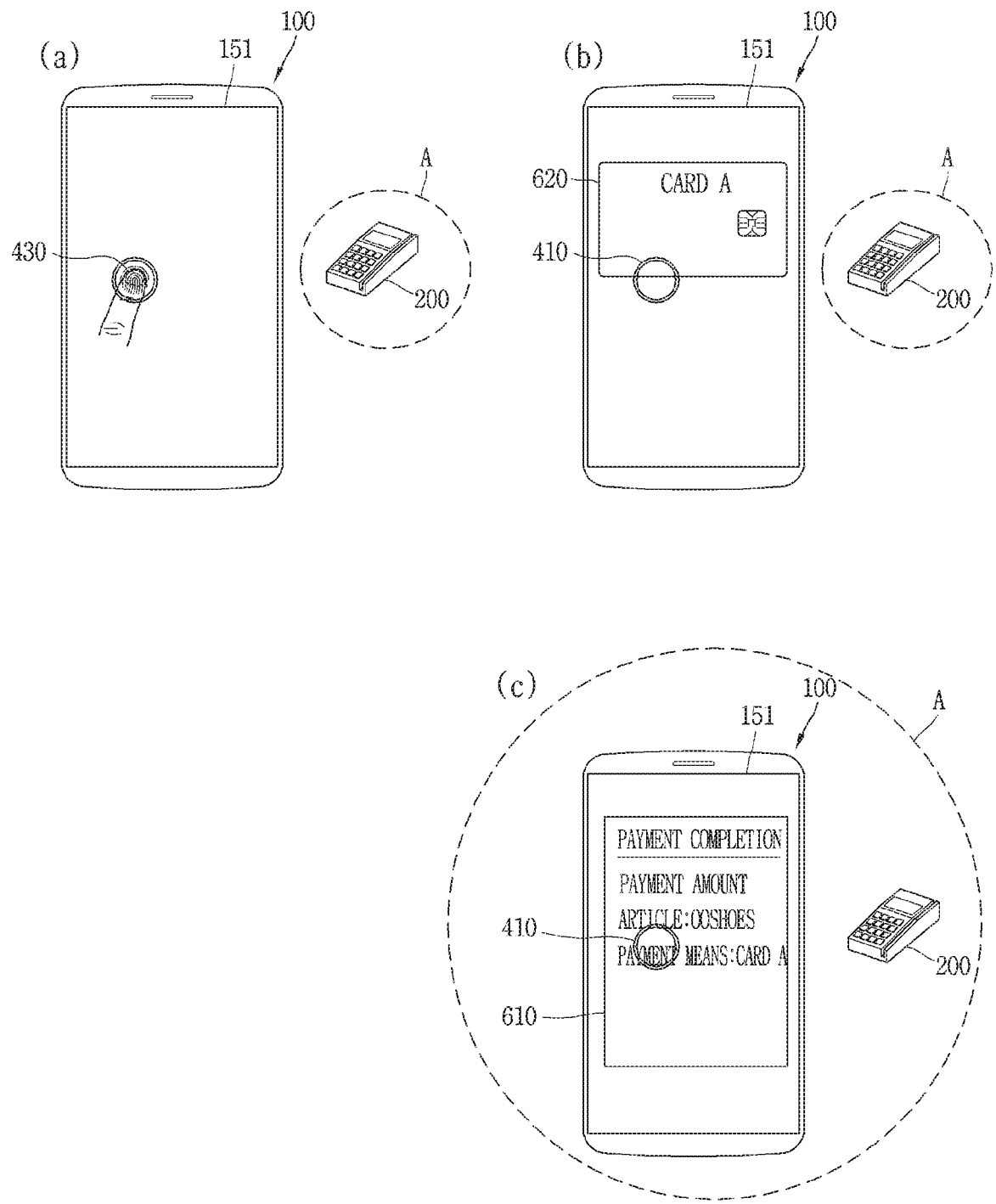
Figure 8C:
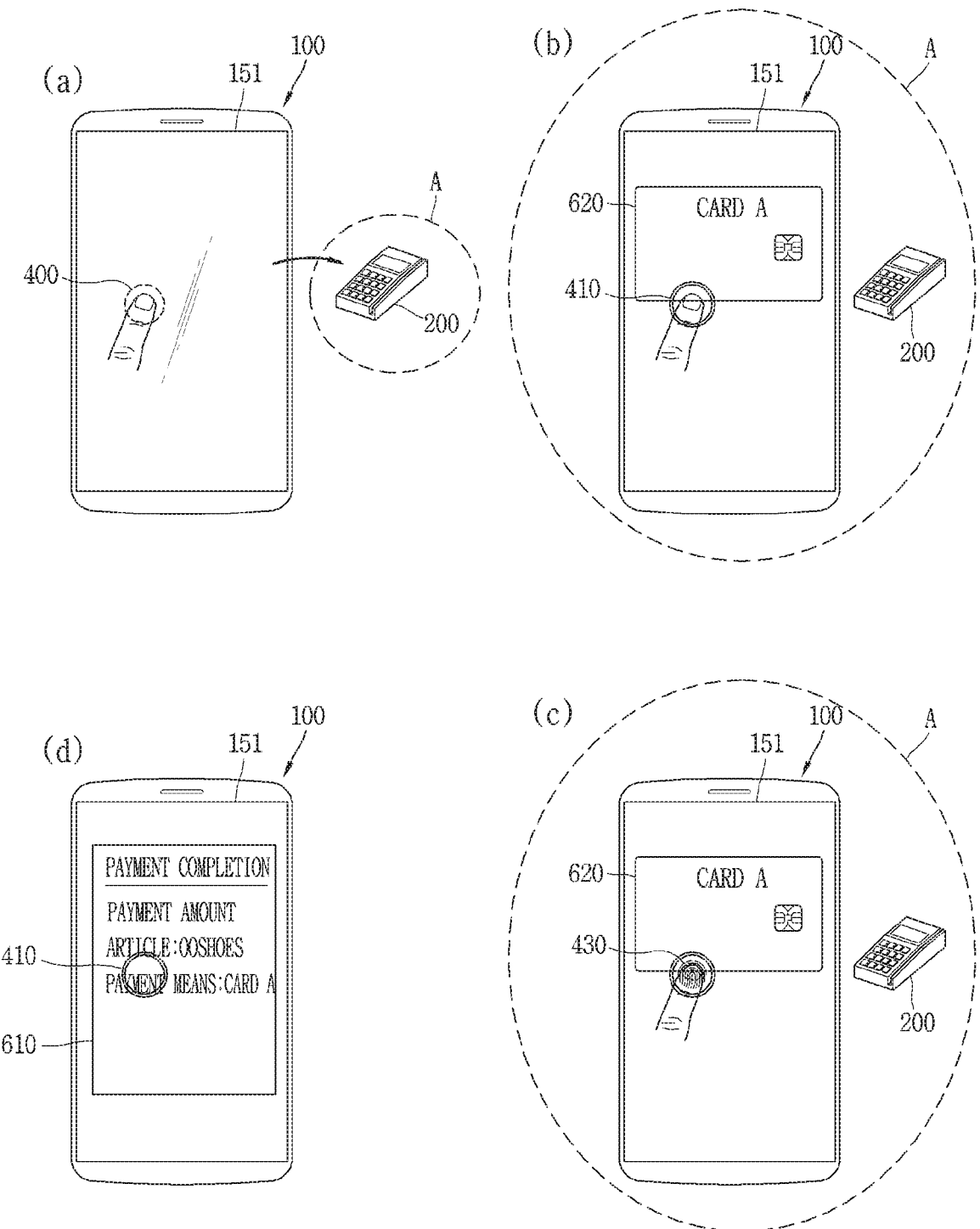

FIG. 7 is a flowchart illustrating a method of performing a payment using a virtual home button according to an embodiment of the present invention. FIGS. 8A, 8B, and 8C are conceptual diagrams for illustrating the method shown in FIG. 7.

Referring to FIG. 7, the control unit 180 may perform fingerprint authentication on a finger applying a touch to the virtual home button (S710). The fingerprint authentication may be performed using the fingerprint recognition sensor 151c provided on the touch screen 151.

In order to perform fingerprint authentication on a finger applying a touch to the virtual home button, on the basis of the fact that a long touch is maintained for a reference time or longer, the control unit 180 may perform the fingerprint authentication.

At this time, the control unit 180 may determine whether fingerprint authentication is performed in a space where wireless communication is possible with an external terminal capable of performing a payment, for example, a POS terminal (S720). The determination may be made on the basis of whether or not a signal related to payment is received through the wireless communication unit 110.

For example, as shown in (a) of FIG. 8A, when the wireless communication exists in the space A where wireless communication is possible with the POS terminal 200, the control unit 180 may receive a signal related to payment transmitted from the POS terminal 200 through the wireless communication unit 110.

During fingerprint authentication, according to whether a signal related to payment is received through the wireless communication unit 110, the control unit 180 may perform a different operation (function) (i.e., a different operation (function) among operations (functions) related to payment).

The signal related to payment may include article information (article name, article price, etc.) to be a payment target, POS terminal location information, total payment price information, and the like.

For example, when a signal related to payment is received through the wireless communication unit 110 during the fingerprint authentication, the control unit 180 may transmit the predetermined payment means information to the POS terminal 200 that transmits the signal through the wireless communication unit 110. In other words, as shown in (a) of FIG. 8A, when the fingerprint authentication 430 is performed in the space A where the mobile terminal 100 is able to perform wireless communication with the POS terminal 200, the control unit 180 may transmit the predetermined payment means information to the POS terminal 200 (S730).

The payment means information means information related to the payment means previously stored in the mobile terminal 100 (specifically, the memory 170). For example, the payment means information may include card information (e.g., card type, card number, validity period, CVC number, and the like) and mobile terminal information (user information, telephone number, carrier information, and the like).

Hereinafter, for convenience of explanation, it is assumed that the payment means is a card. In this case, the payment means information may mean card information.

Thereafter, when payment related information (e.g., payment completion information, payment failure information, detailed payment information, and the like) is received from the POS terminal 200, as shown in (b) of FIG. 8A, the control unit 180 may output the information related to the payment to the touch screen 151. When the information related to the payment is payment completion information, the control unit 180 may output the receipt information to the touch screen 151 on the basis of the payment completion information. At this time, the output of the virtual home button 410 may be continuously maintained on the touch screen 151.

Referring to FIG. 7 again, when a signal related to payment is not received through the wireless communication unit 110 during fingerprint authentication, the control unit 180 may output an image related to the payment means information to the touch screen 151. In other words, when fingerprint authentication is not performed within a space where the mobile terminal 100 wirelessly communicates with the POS terminal 200, the control unit 180 may output an image corresponding to the payment means information to the touch screen 151 (S740).

When the payment means information is card information, the image corresponding to the payment means information may be a card image. When the payment means information is plural, the control unit 180 may select the payment means information satisfying the predetermined condition among the plurality of payment means information, for example, the information of the payment means that most recently performs the payment or the information of the payment means set as the default. Thereafter, the control unit 180 may output an image corresponding to the selected payment means information to the touch screen 151. When a predetermined type of touch (for example, a drag touch, a flick touch, a swipe touch, or the like) is applied to the image corresponding to the payment means information, the control unit 180 may output an image corresponding to the other payment means information to the touch screen 151.

Thereafter, in a state where the image related to the payment means is outputted to the touch screen 151, when the mobile terminal 100 enters a space where wireless communication is possible with the POS terminal 200 by the user (or by an external force), the control unit 180 may transmit the payment means information corresponding to the image being outputted to the POS terminal 200 (S750).

Specifically, in a state where the image related to the payment means is outputted to the touch screen 151, when the mobile terminal 100 enters a space where wireless communication is possible with the POS terminal 200, the control unit 180 may transmit the payment means information related to the image to the POS terminal 200 through the wireless communication unit 110.

Thereafter, when information related to payment is received from the POS terminal after the payment means information is transmitted, the control unit 180 may output the information related to the payment to the touch screen 151.

The above description will be more clearly understood with reference to FIG. 8B. As shown in (a) of FIG. 8B, when a touch (e.g., a second type touch (long touch)) is applied to the virtual home button 410 outputted on the touch screen 151, the control unit 180 performs fingerprint authentication (430) on the fingerprint formed on the finger applying the touch.

At this time, when a signal related to payment is not received through the wireless communication unit during the fingerprint authentication 430 (or the fingerprint authentication is performed in a space outside the space A where wireless communication is possible with the POS terminal 200), as shown in (b) of FIG. 8B, the control unit 180 may output the image 620 related to the payment means information to the touch screen 151.

Thereafter, as shown in (c) of FIG. 8B, in a state where the image 620 related to the payment means information is outputted on the touch screen 151, when the mobile terminal 100 enters within the space A where the mobile terminal 100 communicates wirelessly with the POS terminal 200, the control unit 180 may transmit the payment means information related to the image to the POS terminal 200 through the wireless communication unit 110.

Thereafter, when payment related information is received from the POS terminal 200, as shown in (c) of FIG. 8B, the control unit 180 may output information 610 (e.g., receipt information) related to the payment on the touch screen 151.

The virtual home button output and the payment means information transmission are not limited to the above-described embodiment, and may be performed in various ways.

For example, as shown in (a) of FIG. 8C, in a state where a touch is applied to one area 400 of the touch screen 151, when the mobile terminal 100 enters a space A where wireless communication is possible with the POS terminal 200 by an external force (by the user), as shown in (b) of FIG. 8C, the control unit 180 may output the virtual home button 410 to the one area 400 and output the image 620 related to the payment means information. In other words, when a signal related to payment transmitted from the POS terminal 200 is received while the touch is maintained, the control unit 180 may output the image 620 and the virtual home button 410 related to the payment means information to the touch screen 151. The virtual home button 410 may be outputted on the basis of one area 400 where the touch is maintained.

In other words, when the signal related to the payment is received, the control unit 180 may output the virtual home button 410 and the image related to the payment means information together on the touch screen 151.

When the mobile terminal 100 enters the space A in a state where the touch screen 151 is inactive, the control unit 180 may switch the touch screen 151 to the active state and output at least one of the image 620 related to the payment means information and the virtual home button 410.

In addition, when the mobile terminal 100 enters the space A in a state where the touch screen 151 is active, the control unit 180 may output the virtual home button 410 to the touched area and change the screen information that is being outputted into the image 620 related to the payment means information. When the mobile terminal 100 enters the space A without touching the touch screen 151, the control unit 180 may output the virtual home button 410 at a position that satisfies predetermined conditions (e.g., a position where the virtual home button is outputted most or a position set as a default).

Thereafter, as shown in (c) of FIG. 8C, the control unit 180 may perform the fingerprint authentication 430 on the fingerprint formed on the finger applying a touch to the virtual home button.

At this time, on the basis that the touch applied to the touch screen 151 is continuously maintained when the mobile terminal 100 enters the space A, the control unit 180 may perform the fingerprint authentication 430. As another example, when a new touch different from the touch applied to the touch screen 151 is applied when entering the space A, the control unit 180 may perform fingerprint authentication for the fingerprint formed on the finger applying the new touch.

Thereafter, when the fingerprint authentication is successful, the control unit 180 transmits payment means information associated with the image related to the payment means information outputted on the touch screen 151 to the POS terminal 200 through the wireless communication unit 110.

In other words, when the fingerprint authentication for the fingerprint formed on the finger applying a touch to the virtual home button 410 is performed (succeeded), the control unit 180 may transmit the payment means information associated with the image related to the payment means information to the POS terminal 200 that transmits the information related to the payment through the wireless communication unit 110.

Thereafter, as shown in (d) of FIG. 8C, when payment related information is received from the POS terminal, the control unit 180 may output information (e.g., receipt information 610) related to the payment to the touch screen 151. At this time, the output of the virtual home button 410 may be maintained.

Through this configuration, in the present invention, a user interface capable of outputting a virtual home button in a simpler manner, and a user interface capable of outputting a home screen page using a virtual home button in an optimized manner or performing payment may be provided.

Hereinafter, a method for outputting a virtual home button according to an embodiment of the present invention will be described in detail with reference to the accompanying drawings.

FIGS. 9A, 9B, 9C, 9D, and 9E are conceptual diagrams illustrating various methods for outputting a virtual home button according to an embodiment of the present invention.

The mobile terminal 100 related to the present invention may output a virtual home button in various ways. As described above, on the basis of the predetermined type of touch being applied to a touch screen in an inactive or active state, the control unit 180 may output a virtual home button in one area to which the touch is applied.

Figure 9A:
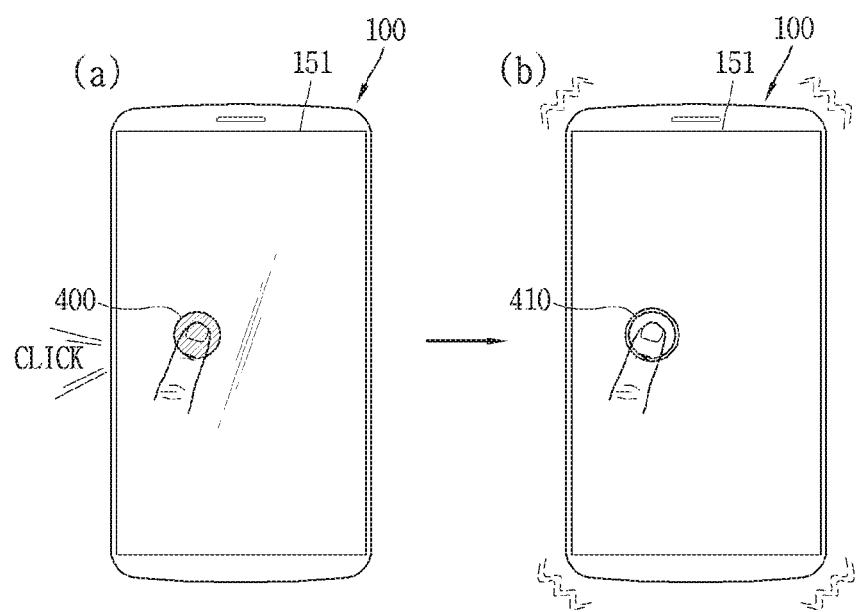
FIGS. 9A, 9B, 9C, 9D, and 9E are conceptual diagrams illustrating various methods for outputting a virtual home button according to an embodiment of the present invention.

As an additional example, as shown in (a) and (b) of FIG. 9A, on the basis of the fact that a touch is applied to one area 400 of the touch screen 151 at a reference pressure or more, the control unit 180 may output the virtual home button 410 to the one area.

Specifically, the virtual home button may be outputted when the pressure of the touch applied to one area is equal to or greater than a reference pressure. A touch in which a touch is applied at a reference pressure or more may be, for example, a force touch.

When a touch is applied at the reference pressure or more, the touch screen 151 related to the present invention may be configured to feed back the user that the touch is applied beyond the reference pressure. For example, as shown in FIG. 9A, when a touch (force touch) is applied to the touch screen 151 at a reference pressure or more (when force touch is applied), the user may feel the feedback of "click."

When the virtual home button 410 is outputted as shown in (b) of FIG. 9A, the control unit 180 may generate a vibration to notify that the virtual home button is outputted. The vibration may be generated, for example, by the haptic module 153 described with reference to FIG. 1A.

Figure 9B:
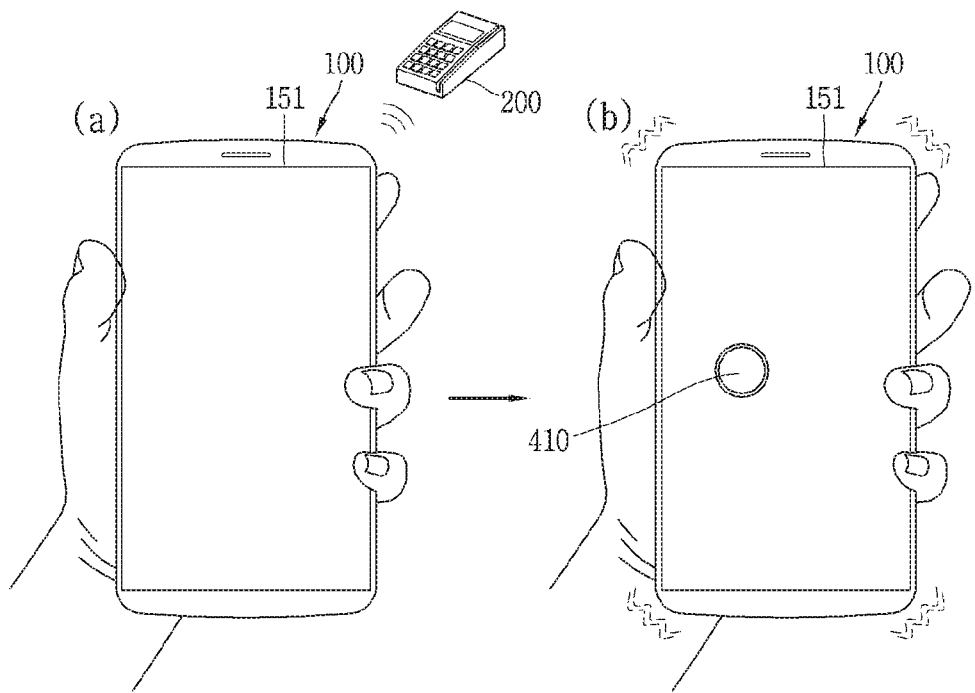

As another example, as shown in FIG. 9B, on the basis of the reception of a signal related to the payment through the wireless communication unit 110, the control unit 180 may output the virtual home button 410 to the touch screen 151. As described above with reference to FIG. 8C, when the mobile terminal 100 enters a space where wireless communication is possible with the POS terminal 200, the control unit 180 may output the virtual home button 410 to the touch screen 151.

At this time, when the touch is maintained on the touch screen 151, the control unit 180 may output the virtual home button 410 on the basis of one area where the touch is maintained. Specifically, when a signal related to the payment is received while a touch is maintained in one area on the touch screen 151, the control unit 180 may output the virtual home button 410 to the one area.

Contrary, in a state where the touch is not maintained on the touch screen 151, when the mobile terminal 100 enters a space where wireless communication is possible with the POS terminal (when a signal related to payment is received from the POS terminal in a state where no touch is applied), the control unit 180 may output the virtual home button 410 at a position that satisfies predetermined conditions.

Specifically, when a signal related to the payment is received through the wireless communication unit 110 in a state where no touch is applied to the touch screen 151, the control unit 180 may output the virtual home button 410 at a predetermined position (a position satisfying predetermined conditions).

The predetermined position (the position satisfying the predetermined condition) may be, for example, a position where the virtual home button is outputted most or a position set as a default. In addition, the predetermined position may be determined by user settings or on the basis of the areas where the virtual home button is previously outputted.

Figure 9C:
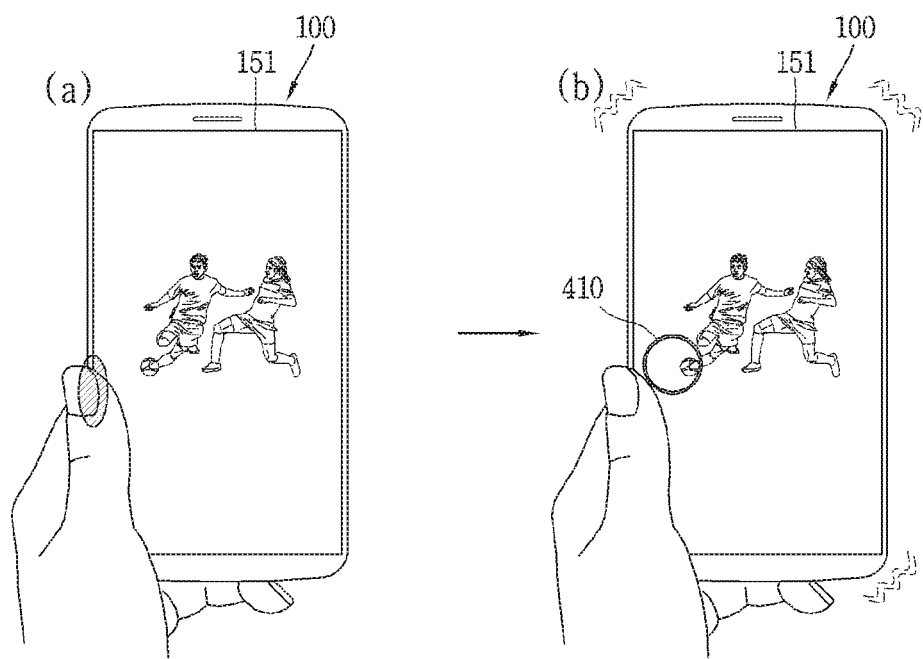

As another example, as shown in FIG. 9C, on the basis of the touch (or force touch) applied to the edge of the touch screen 151, the control unit 180 may output the virtual home button 410 to the touch screen 151.

At this time, the control unit 180 may output the virtual home button 410 to an area adjacent to the touched portion of the edge, or output the virtual home button 410 to a position satisfying predetermined conditions.

Figure 9D:
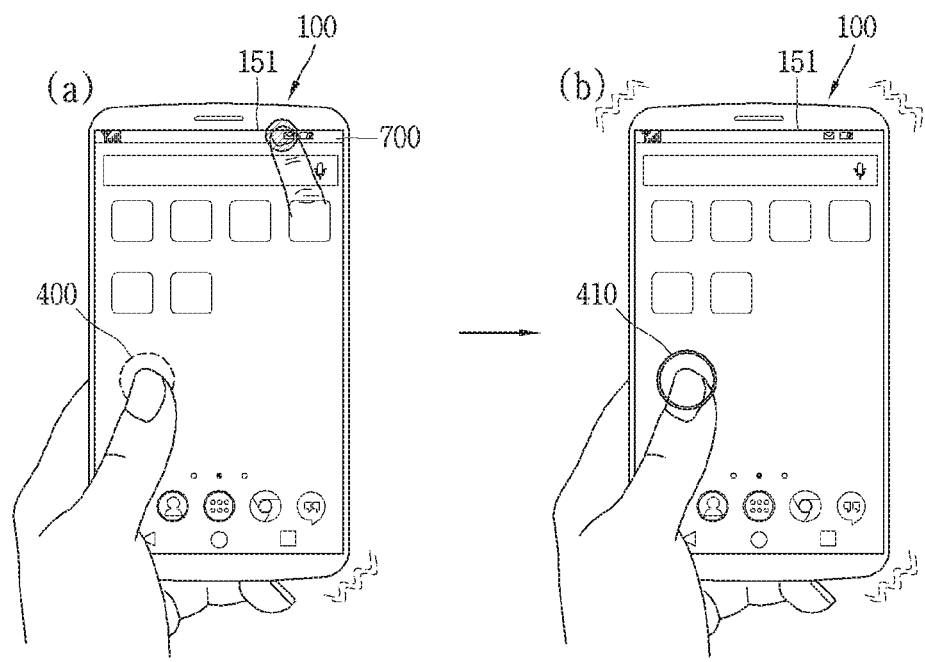

As another example, as shown in FIG. 9D, in a state where the touch screen 151 is active, when a predetermined type of touch is applied to one area on the touch screen 151 in a state where the touch is maintained in a predetermined area (e.g., a status display line (or a status display bar 700), the control unit 180 may output the virtual home button 410 to the one area.

The status display line may be understood as a graphic object (bar) that displays at least one of a status of a mobile terminal, a time, and an indicator for notifying that event information occurs.

Figure 9E:
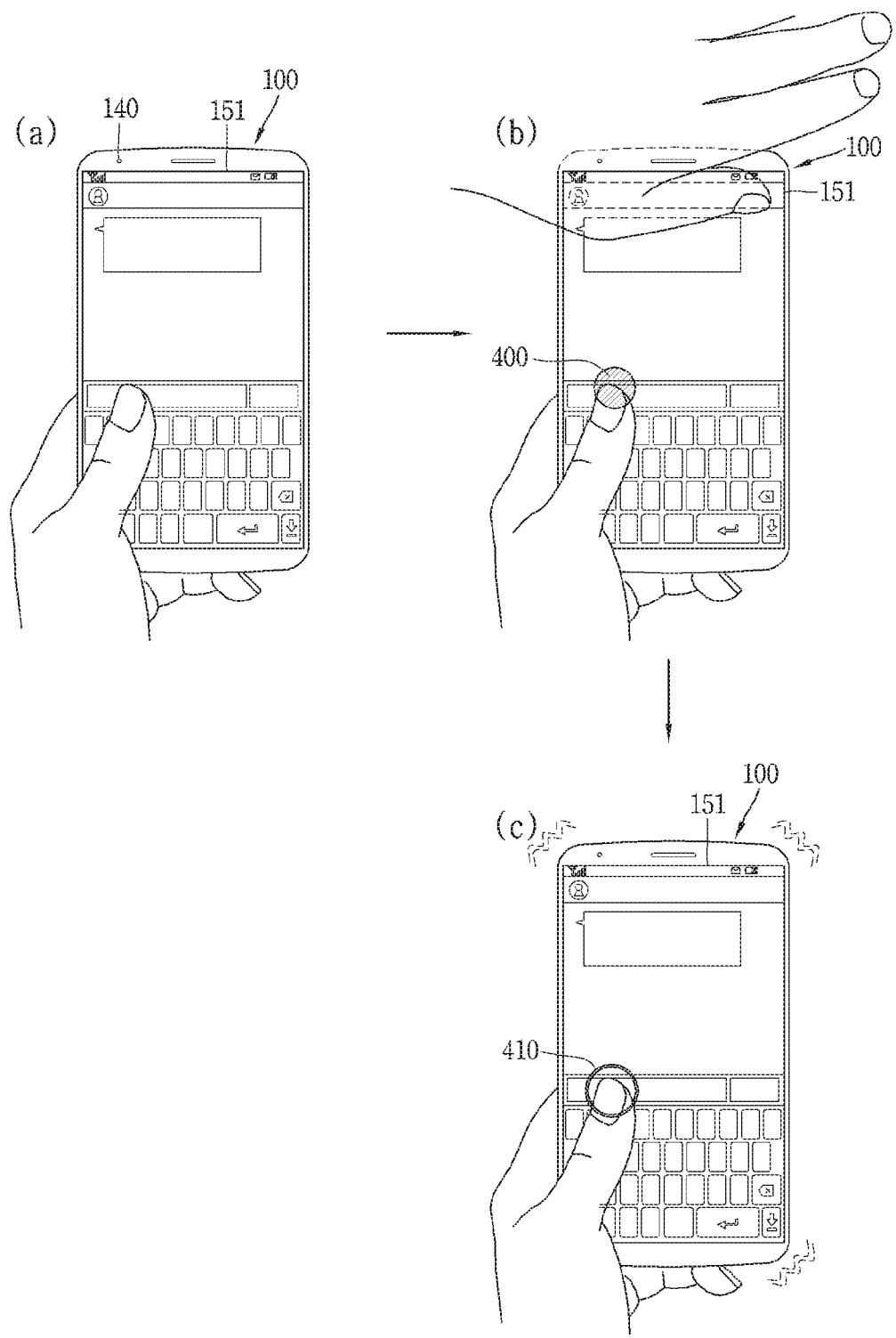

As another example, as shown in (a) of FIG. 9E, the mobile terminal related to the present invention may be provided with a sensing unit 140. At this time, as shown in (b) of FIG. 9E, when a predetermined type of touch is applied to one area 400 of the touch screen 151 in a state where the sensing unit 140 is covered (covered state) by a specific object (e.g., a user's hand), the control unit 180 may output the virtual home button 410 to the one area 400.

Through this configuration, the present invention may provide a user interface capable of outputting a virtual home button to the touch screen 151 in various ways. However, the present invention is not limited thereto. The mobile terminal related to the present invention may output the virtual home button in various ways. When only the meaning of outputting the virtual home button in one area to which a predetermined type of touch is applied is implied, it should be understood as being within the scope of the present invention.

Hereinafter, various user interfaces implemented using the virtual home button will be described in more detail with reference to the accompanying drawings.

FIGS. 10A, 10B, 11A, 11B, 11C, 12A, and 12B are conceptual diagrams illustrating various user interfaces using a virtual home button according to an embodiment of the present invention.

Figure 10A:
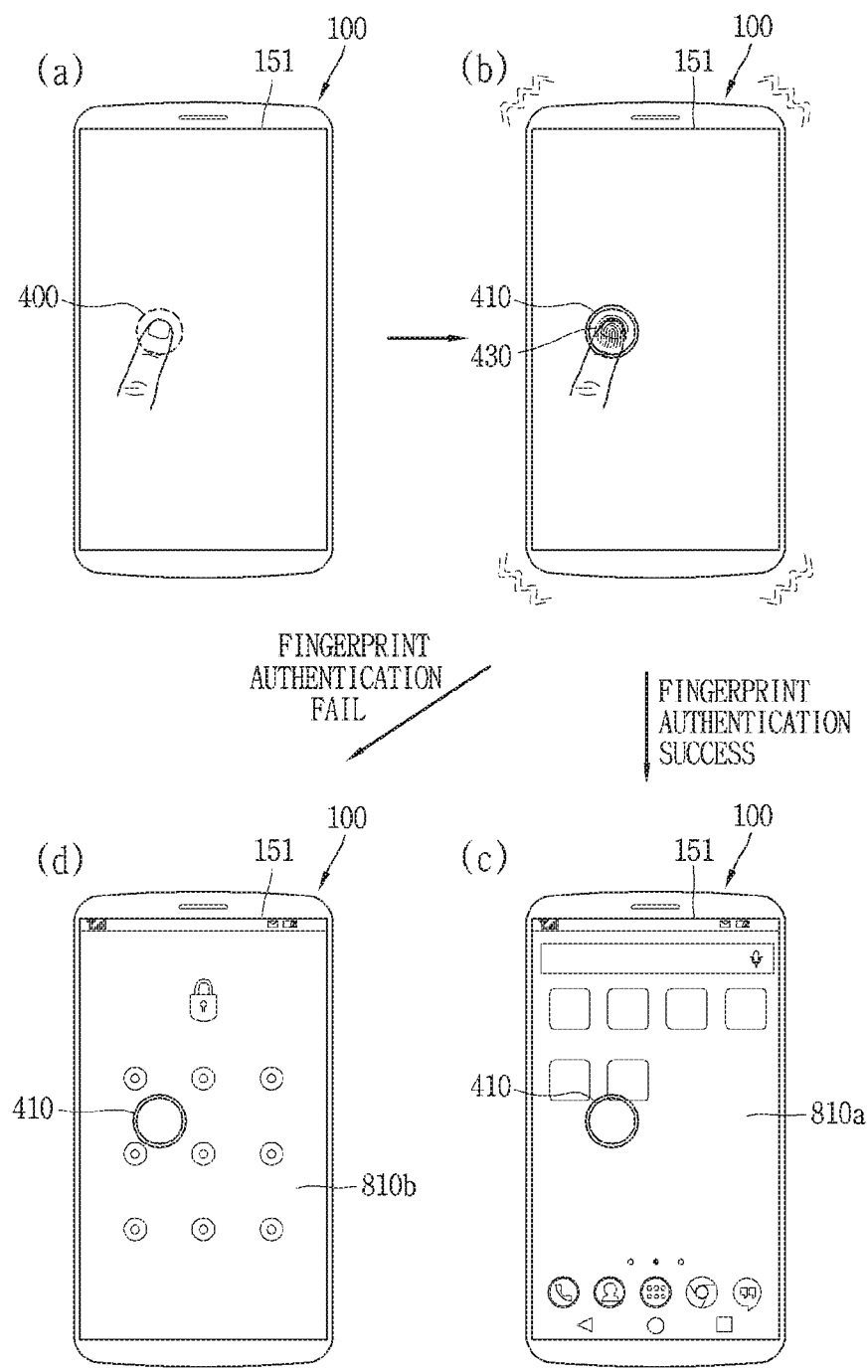

As shown in (a) and (b) of FIG. 10A, when a predetermined type of touch is applied to one area 400 on the touch screen 151, the control unit 180 may output the virtual home button 410 to the area 400 to which the touch is applied. In addition, the control unit 180 may perform the fingerprint authentication 430 on the fingerprint formed on the finger applying a touch to the virtual home button 410.

At this time, on the basis of whether or not the fingerprint authentication 430 for the fingerprint formed on the finger applying a touch to the virtual home button 410 is successful, the control unit 180 may output different screen information to the touch screen 151.

For example, as shown in (c) of FIG. 10A, when the fingerprint authentication is successful, the control unit 180 may output the first screen information (e.g., the home screen page 810a) to the touch screen 151. Although not shown, as described with reference to FIG. 8B, on the basis of the successful fingerprint authentication, the control unit 180 may output an image related to the payment means information to the touch screen 151.

Whether to output a home screen page or to output an image related to the payment means information may be determined by the user setting.

As another example, as shown in (d) of FIG. 10A, when the fingerprint authentication fails, the control unit 180 may output the second screen information 810b different from the first screen information to the touch screen 151. The second screen information 810b may be, for example, a lock screen. That is, in the present invention, the lock may be released on the basis of whether the fingerprint authentication is successful through the virtual home button.

As another example, on the basis of the touch applied after the successful fingerprint authentication is performed through the virtual home button, the mobile terminal according to the present invention may output various screen information to the touch screen 151.

Specifically, after the fingerprint authentication for the fingerprint formed on the finger applying the first touch to the virtual home button 410 is successful, according to a method (type) of the second touch continuously applied to the first touch, the control unit 180 may output different screen information to the touch screen 151.

The second touch continuously applied to the first touch may be a touch continuously applied to the first touch while the first touch is not released from the touch screen 151. The first touch may be a long touch applied for a reference time or more to perform fingerprint authentication.

For example, as shown in (a) of FIG. 10B, on the basis of the first touch applied to the virtual home button 410, the control unit 180 may perform the fingerprint authentication 430 on the fingerprint formed on the finger applying the first touch.

After successful fingerprint authentication, as shown in (b) of FIG. 10B, when the second touch continuously applied to the first touch is a long touch in which the virtual home button 410 is maintained for the reference time or longer (i.e., the first touch is continuously maintained on the virtual home button 410 after the fingerprint authentication is successful by the first touch), the touch screen 151 may output the home screen page 810a as shown in (c) of FIG. 10B.

Specifically, when the first touch is continuously maintained after the fingerprint authentication is successfully performed by the first touch (that is, when the second touch continuous to the first touch is a long touch), the control unit 180 may output the home screen page 810a to the touch screen 151.

Meanwhile, after successful fingerprint authentication, as shown in (d) of FIG. 10B, when the second touch continuously applied to the first touch is a drag touch starting from the virtual home button 410, as shown in (e) of FIG. 10B, at least one graphic object 820a or 820b associated with a specific function around the virtual home button 410 may be outputted to the touch screen 151. For example, the graphic objects 820a and 820b associated with the specific functions may be graphic objects associated with payment related functions.

In relation to the graphic object associated with the payment related function, the output position may be determined on the basis of the direction in which the second touch, that is, the drag touch, is applied.

Through this configuration, the present invention may provide a user interface that allows a user to perform a desired function immediately after successful fingerprint authentication.

Meanwhile, the present invention may provide a user interface that more conveniently controls screen information related to payment using a virtual home button.

Figure 11A:
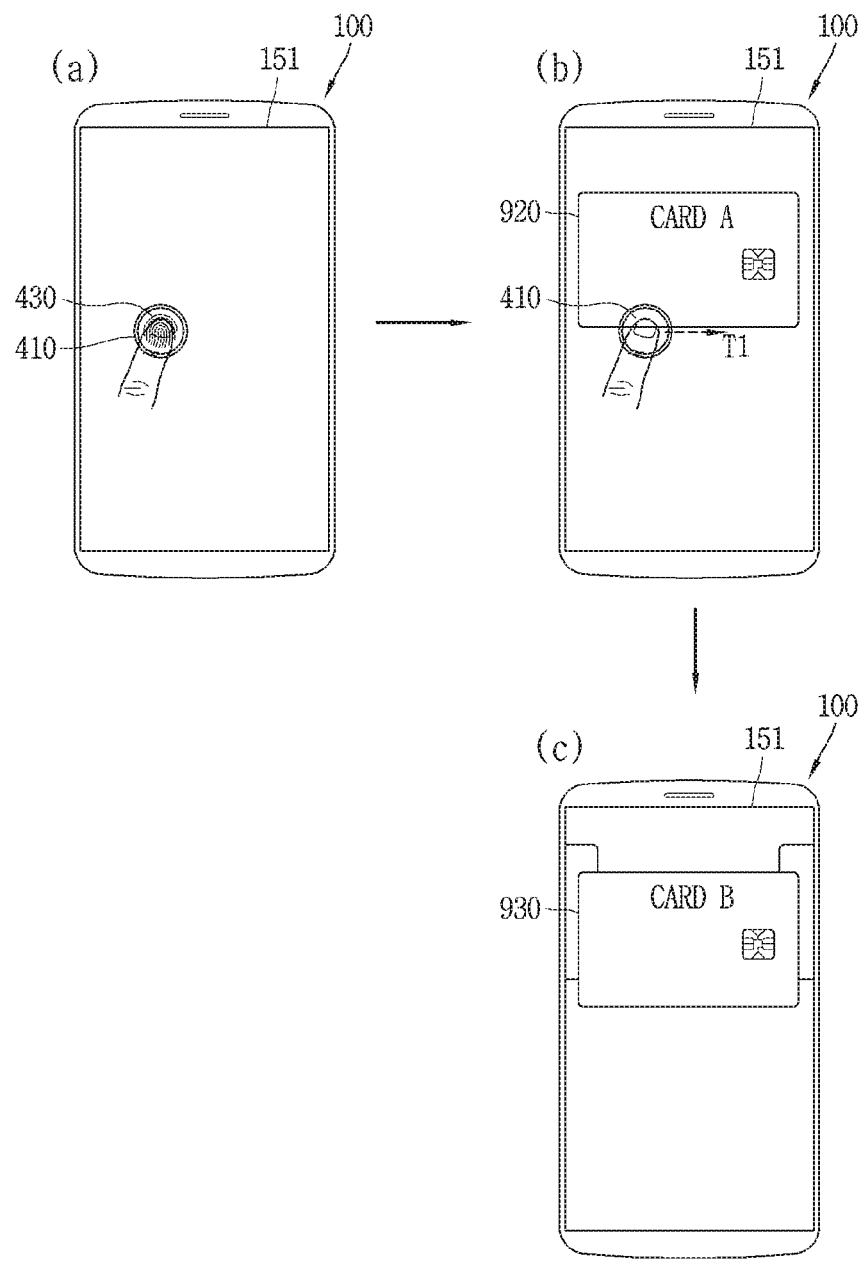

For example, as shown in (a) and (b) of FIG. 11A, when the fingerprint authentication for the fingerprint formed on the finger applying a touch to the virtual home button 410 is successful, the touch screen 151 may output an image 920 related to the payment means information.

As shown in (b) of FIG. 11A, in a state where the image 920 associated with the payment means information is outputted, when the drag touch T1 (or the new drag touch T1) continuously applied in the touch is applied in the first direction in the virtual home button, as shown in (c) of FIG. 11A, the control unit 180 may change the image 920 associated with the payment means information to an image 930 associated with other payment means information. Here, the first direction may be, for example, a horizontal direction (right or left direction).

However, the present invention is not limited thereto. When a predetermined type of touch (e.g., a drag touch, a swipe touch, a short touch, a flick touch, etc.) is applied to the image 920 associated with the payment means information, the control unit 180 may output the image 930 related to the other payment means information to the touch screen 151.

Figure 11B:
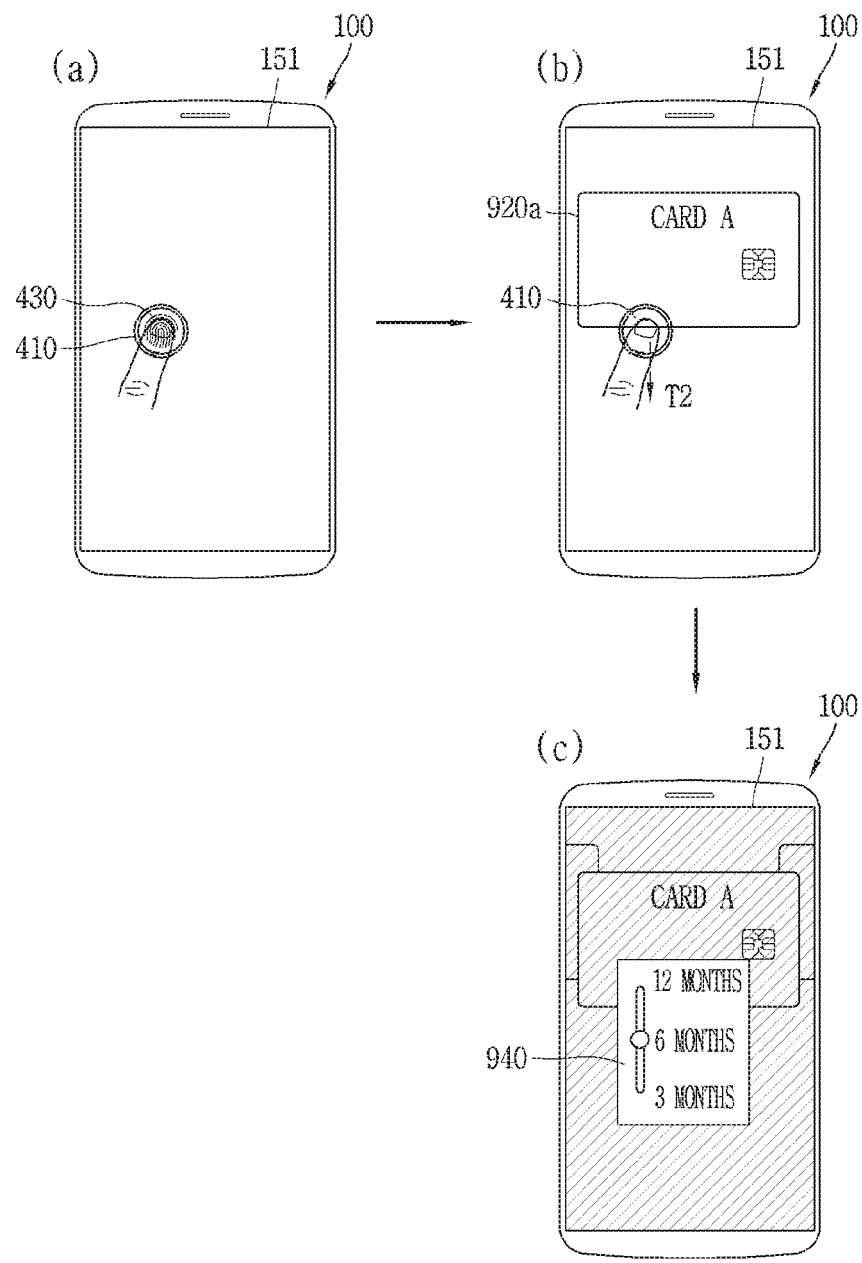

As another example, as shown in (a) and (b) of FIG. 11B, in a state where the image 920 associated with the payment means information is outputted to the touch screen 151, when the drag touch T2 (or the new drag touch T2) continuously applied in the touch applied for fingerprint authentication is applied in the second direction different from the first direction in the virtual home button 410, the control unit 180 may output a pop-up window 940 associated with the payment method to the touch screen 151, as shown in (c) of FIG. 11B. For example, the user may select the installment, installment months, etc. through the pop-up window 940 associated with the payment method.

The second direction may be, for example, a vertical direction (upward or downward direction).

Figure 11C:
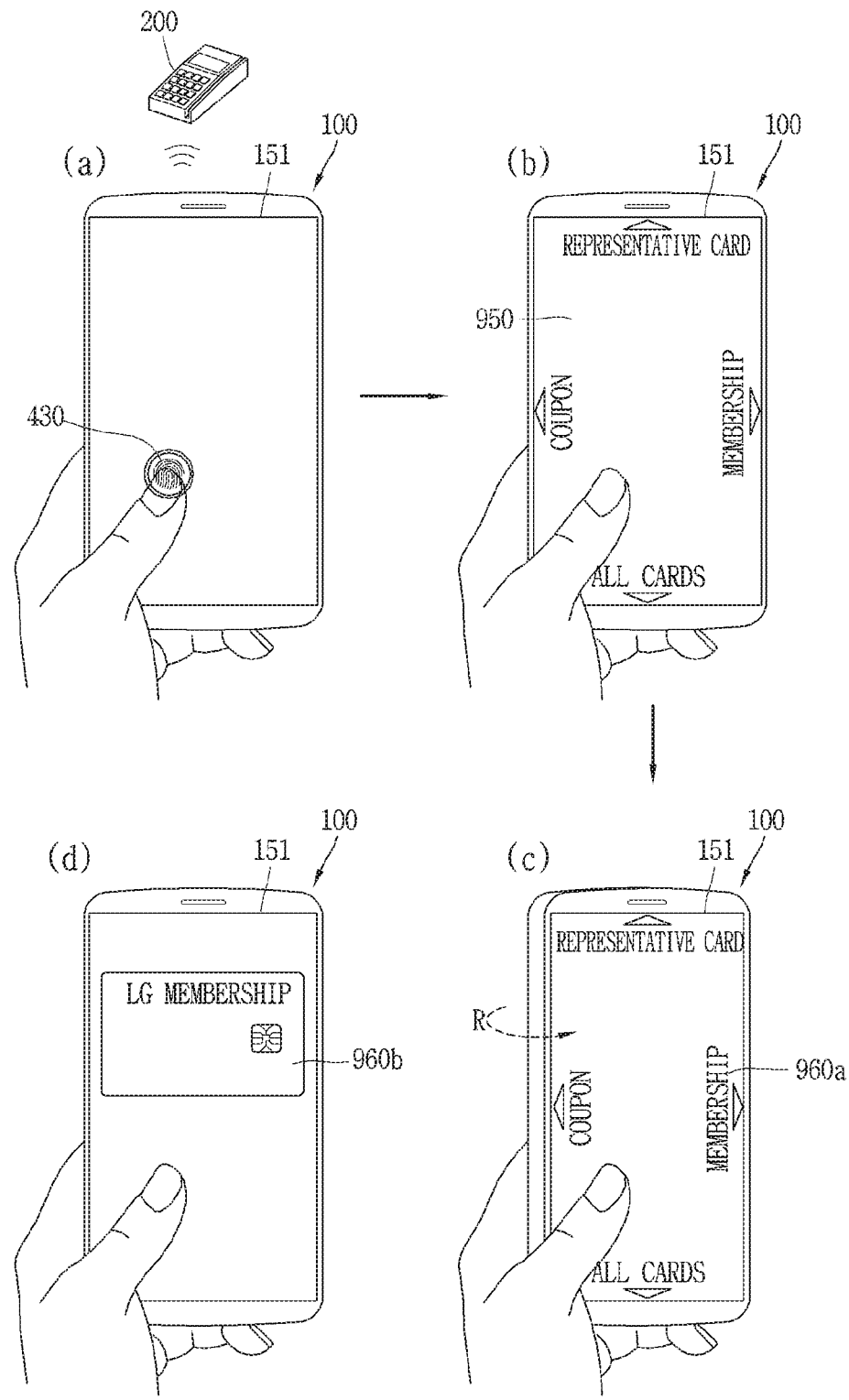

Meanwhile, as shown in (a) of FIG. 11C, when a signal related to payment is received through the wireless communication unit 110 while the fingerprint authentication 430 is performed on the virtual home button 410 (i.e., when fingerprint authentication is performed in a space where wireless communication is possible with the POS terminal 200, or when a signal related to payment is received through the wireless communication unit during fingerprint authentication), as shown in (b) of FIG. 11C, the control unit 180 may output screen information 950 to the touch screen 151 that guides to output an image related to the payment means information.

In this state, when the movement R of the main body is sensed through the sensing unit 140, on the basis of the movement R, the control unit 180 may select the image 960b associated with the specific payment means information.

For example, when the movement R is a rightward rotation, the image 960b corresponding to the payment means information 960a to be outputted when the rightward movement is performed may be outputted to the touch screen 151.

Figure 12A:
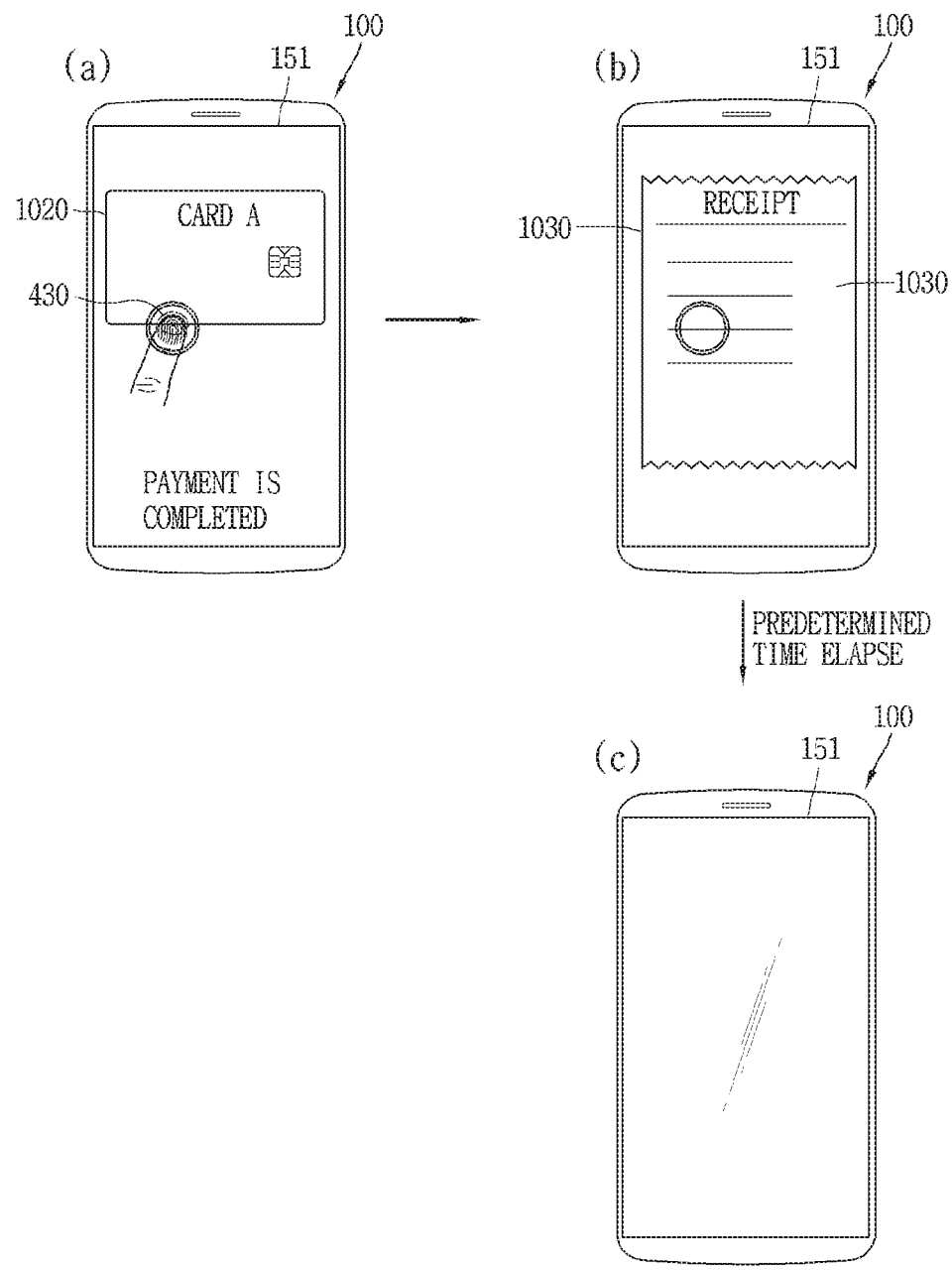

Referring to FIG. 12A, in a state where information 1020 related to payment means information is outputted, on the basis of the success of the fingerprint authentication 430 through the virtual home button 410, the control unit 180 may perform payment by transmitting the payment means information to the POS terminal.

Thereafter, on the basis of information (e.g., payment completion information) related to payment received from the POS terminal, as shown in (b) of FIG. 12A, the control unit 180 may output the receipt information 1030. At this time, the output of the virtual home button 410 may be maintained.

Thereafter, when no touch is applied to the touch screen 151 for a predetermined time, as shown in (c) of FIG. 12A, the control unit 180 may switch the touch screen 151 from the active state to the inactive state.

Figure 12B:
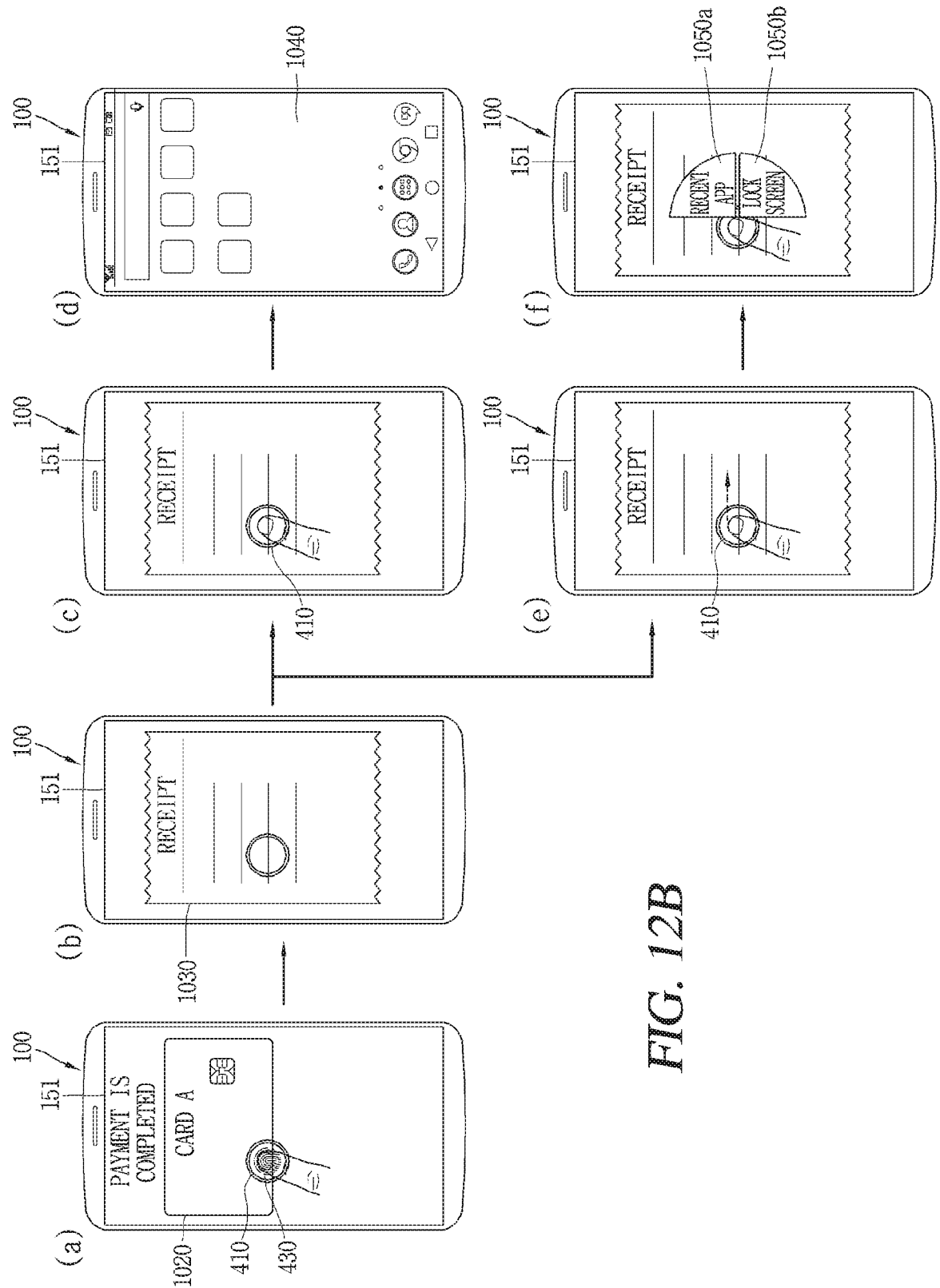

Meanwhile, as shown in (a) and (b) of FIG. 12B, on the basis of the payment performed through fingerprint authentication, in a state where the receipt information 1030 is outputted to the touch screen 151, as shown in (c) of FIG. 12B, when the virtual home button 410 is touched, as shown in (d) of FIG. 12B, the control unit 180 may output the home screen page 1040 to the touch screen 151.

Meanwhile, as shown in (e) of FIG. 12, in a state where the receipt information 1030 is outputted to the touch screen 151, when a drag touch starting from the virtual home button 410 is applied, the control unit 180 may display at least one graphic object 1050a or 1050b associated with a particular function around the virtual home button 410.

Although not shown in the drawing, in a state where the receipt information 1030 is outputted, when fingerprint authentication is performed again within a space where the mobile terminal 100 wirelessly communicates with the POS terminal 200 that performs the payment, the control unit 180 may transmit a signal requesting cancellation of the payment corresponding to the receipt information 1030 to the POS terminal 200 through the wireless communication unit 110.

As another example, in a state where the receipt information 1030 is outputted, on the basis that the mobile terminal 100 enters into a space where wireless communication is possible with the POS terminal 200 that performs the payment, the control unit 180 may transmit a signal requesting cancellation of the payment to the POS terminal 200 through the wireless communication unit 110.

As described above, according to the present invention, there are provided a mobile terminal capable of performing fingerprint recognition through a touch screen and providing various functions through this and a control method thereof.

Also, since it is not necessary to provide a separate home button by outputting a virtual home button to an area of a touch screen where a touch is applied, the present invention may enlarge the size of the touch screen and output the virtual home button in the touched area, thereby significantly improving convenience for the user.

In addition, the present invention may provide a user interface capable of performing fingerprint recognition through a virtual home button and performing payment when fingerprint recognition is successful.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal comprising:
a wireless communication unit;
a touch screen including a fingerprint recognition sensor; and
a controller configured to:
cause the touch screen to display a virtual home button at once at one area of the touch screen based on a direct touch received at the one area;
perform fingerprint authentication on a fingerprint of a finger used to apply the direct touch via the fingerprint recognition sensor of the touch screen when the direct touch is maintained at the one area after the virtual home button is displayed such that the direct touch is subsequently applied to the virtual home button;
perform a payment related operation when a signal related to payment is received via the wireless communication unit while the fingerprint authentication is performed; and
perform an operation not related to payment when no signal related to payment is received while the fingerprint authentication is performed.
2. The mobile terminal of claim 1, wherein:
performing the payment related operation comprises causing the wireless communication unit to transmit predetermined payment means information to a Point of Sale (POS) terminal transmitting the signal related to payment; and
the performing the operation not related to payment comprises causing the touch screen to display a home screen page.
3. The mobile terminal of claim 1, wherein:
the virtual home button is circular and associated with at least one of a home screen page output function, a fingerprint recognition function, or a payment related function; and
the signal related to payment comprises a signal received from a Point of Sale (POS) terminal capable of performing wireless communication with the wireless communication unit.
4. The mobile terminal of claim 1,
wherein the controller is further configured to:
switch the touch screen from an inactive state to an active state and cause the touch screen to display the virtual home button in response to the direct touch, the direct touch received while the touch screen is in the inactive state;
perform another fingerprint authentication in response to a first type of touch received on the virtual home button to perform a first operation; and
perform a second operation in response to a second type of touch received on the virtual home button, wherein the another fingerprint authentication is not performed in response to the second type of touch.
5. The mobile terminal of claim 4, wherein the first operation in response to the first type of touch is a payment related function that is performed when the fingerprint is successfully authenticated.
6. The mobile terminal of claim 4, wherein the controller is further configured to cause the touch screen to display a home screen page when the second operation is performed.
7. The mobile terminal of claim 6, wherein:
the first type of touch is a long touch in which a touch is maintained on the virtual home button at least for a reference time; and
the second type of touch is a short touch in which a touch is applied on the virtual home button for less than the reference time.

8. The mobile terminal of claim 5, wherein performing the first operation comprises:
   causing the wireless communication unit to transmit predetermined payment means information to a Point of Sale (POS) terminal transmitting a signal related to payment to perform the payment related function in response to the first type of touch; and
   causing the touch screen to display an image related to the payment means information when the signal related to payment is not received while the fingerprint authentication is performed.

9. The mobile terminal of claim 8, wherein the controller is further configured to cause the wireless communication unit to transmit the payment means information associated with the image to the POS terminal when the mobile terminal enters a space that allows the wireless communication unit to communicate with the POS terminal, wherein the mobile terminal enters the space while the image related to the payment means information is displayed via the touch screen.

10. The mobile terminal of claim 1, wherein the controller is further configured to cause the touch screen to display the virtual home button when pressure of the direct touch applied to the one area on the touch screen is equal to or greater than a reference pressure such that the virtual home button is not displayed when the pressure is less than the reference pressure.

11. The mobile terminal of claim 1, wherein the controller is further configured to cause the mobile terminal to vibrate when the virtual home button is displayed via the touch screen in response to the direct touch received at the one area of the touch screen.

12. The mobile terminal of claim 1, wherein the controller is further configured to cause the touch screen to continue displaying the virtual home button based on whether the signal related to payment is received via the wireless communication unit.

13. The mobile terminal of claim 12, wherein the controller is further configured to cause the touch screen to:
   display the virtual home button at the one area of the touch screen when the signal is received while the direct touch is maintained at the one area or at the virtual home button; and
   display the virtual home button at a predetermined position of the touch screen when the signal is received while the direct touch is no longer maintained at the one area of the touch screen.

14. The mobile terminal of claim 13, wherein the predetermined position is determined by user setting or the predetermined position corresponds to an area of the touch screen where the virtual home button has been previously displayed.

15. The mobile terminal of claim 12, wherein the controller is further configured to:
   cause the touch screen to display an image related to payment means information in addition to the virtual home button in response to the signal related to payment; and
   cause the wireless communication unit to transmit the payment means information associated with the image to a Point of Sale (POS) terminal transmitting the signal related to payment when the fingerprint is authenticated.

16. The mobile terminal of claim 1, wherein the controller is further configured to cause the touch screen to display different screen information based on whether or not the fingerprint is authenticated successfully such that a first image is displayed when the fingerprint is authenticated successfully and a second image is displayed when the fingerprint authentication fails.

17. The mobile terminal of claim 1, wherein:
   the direct touch received at the one area of the touch screen prior to the displaying of the virtual home button is a first touch;
   the fingerprint authentication is not performed until the virtual home button is displayed in response to the first touch;
   a second touch is received on the virtual home button following the first touch when the virtual home button is displayed, and the second touch is maintained on the virtual home button after the fingerprint is successfully authenticated; and
   the controller is further configured to cause the touch screen to display different screen information according to a type of the second touch.

18. The mobile terminal of claim 17, wherein:
   a home screen page is displayed via the touch screen when the second touch is a long touch maintained for at least a reference time on the virtual home button; and
   at least one graphic object associated with a payment related function is displayed based on a location of the virtual home button when the second touch is a drag touch starting from the virtual home button.

19. The mobile terminal of claim 1, wherein the controller is further configured to:
   cause the touch screen to display first payment card information distinguishably from the virtual home button when the fingerprint is authenticated successfully, wherein the virtual home button, which has been displayed prior to displaying the first payment card information, is continuously displayed when the first payment card information is displayed; and
   cause the touch screen to display second payment card information instead of the first payment card information when a first drag touch is received via the virtual home button while the first payment card information is displayed.

20. The mobile terminal of claim 19, wherein:
   the controller is further configured to cause the touch screen to display a menu associated with the first payment card information when a second drag touch is received via the virtual home button while the first payment card information is displayed, the second drag touch received in a second direction that is different from a first direction of the first drag touch; and
   the first direction and the second direction are perpendicular to each other.

* * * * *